US010477769B2

(12) United States Patent
Johnson et al.

(10) Patent No.: US 10,477,769 B2
(45) Date of Patent: Nov. 19, 2019

(54) DRIVE SYSTEM FOR PADDLE BELT CONVEYOR

(71) Applicant: Ag Growth International Inc., Winnipeg (CA)

(72) Inventors: Zachary Johnson, Swift Current (CA); Ronald Klassen, Swift Current (CA)

(73) Assignee: AG GROWTH INTERNATIONAL INC., Winnipeg, Manitoba (CA)

( * ) Notice: Subject to any disclaimer, the term of this patent is extended or adjusted under 35 U.S.C. 154(b) by 0 days.

(21) Appl. No.: 15/845,251

(22) Filed: Dec. 18, 2017

(65) Prior Publication Data

US 2018/0168104 A1 Jun. 21, 2018

Related U.S. Application Data

(60) Provisional application No. 62/436,170, filed on Dec. 19, 2016.

(51) Int. Cl.
| | |
|---|---|
| *A01D 61/02* | (2006.01) |
| *A01D 57/20* | (2006.01) |
| *B65G 15/44* | (2006.01) |
| *B65G 23/12* | (2006.01) |
| *A01D 87/02* | (2006.01) |
| *B65G 41/00* | (2006.01) |

(52) U.S. Cl.
CPC ............. *A01D 61/02* (2013.01); *A01D 57/20* (2013.01); *B65G 15/44* (2013.01); *B65G 23/12* (2013.01); *A01D 87/02* (2013.01); *B65G 41/008* (2013.01)

(58) Field of Classification Search
CPC ........ B65G 23/00; B65G 23/02; B65G 23/04; B65G 23/10
USPC ..................... 198/690.2, 832, 835
See application file for complete search history.

(56) References Cited

U.S. PATENT DOCUMENTS

| | | | | | |
|---|---|---|---|---|---|
| 2,452,980 | A | * | 11/1948 | Beltz ...................... | B65G 23/44 |
| | | | | | 198/813 |
| 2,553,964 | A | * | 5/1951 | Eggleston .............. | B65G 23/00 |
| | | | | | 198/790 |
| 2,556,920 | A | * | 6/1951 | Hills ...................... | B65G 37/00 |
| | | | | | 198/524 |
| 2,875,888 | A | * | 3/1959 | Swain .................... | B65G 23/34 |
| | | | | | 198/318 |
| 3,973,446 | A | * | 8/1976 | Vasilantone ........... | B65G 39/16 |
| | | | | | 474/107 |
| 4,225,034 | A | * | 9/1980 | Sarovich ................ | B65G 17/12 |
| | | | | | 198/607 |

(Continued)

*Primary Examiner* — William R Harp
(74) *Attorney, Agent, or Firm* — Wegman Hessler

(57) ABSTRACT

A drive system for a paddle belt conveyor comprises a drive shaft and a drive roller rotationally driven by the drive shaft about a first axis. The drive roller exerts traction on a belt of the belt conveyor. The belt comprises a plurality of paddles. The drive system includes a pinch roller mounted rotationally about a second axis parallel to the first axis. The pinch roller pinches the belt between the pinch roller and the drive roller to augment the traction of the drive roller on the belt. Either the drive roller or the pinch roller is a bobbin roller to accommodate the paddles on the belt. The drive system may further include a take-up roller rotatable about a third axis parallel to the first axis, and first and second idler rollers rotatable about fourth and fifth axes parallel to the first axis.

13 Claims, 24 Drawing Sheets

(56) References Cited

U.S. PATENT DOCUMENTS

| | | | | |
|---|---|---|---|---|
| 5,641,056 A | * | 6/1997 | Lem | B65G 15/42 |
| | | | | 198/699.1 |
| 2004/0149545 A1 | * | 8/2004 | Tarantino | A01D 45/263 |
| | | | | 198/690.2 |

* cited by examiner

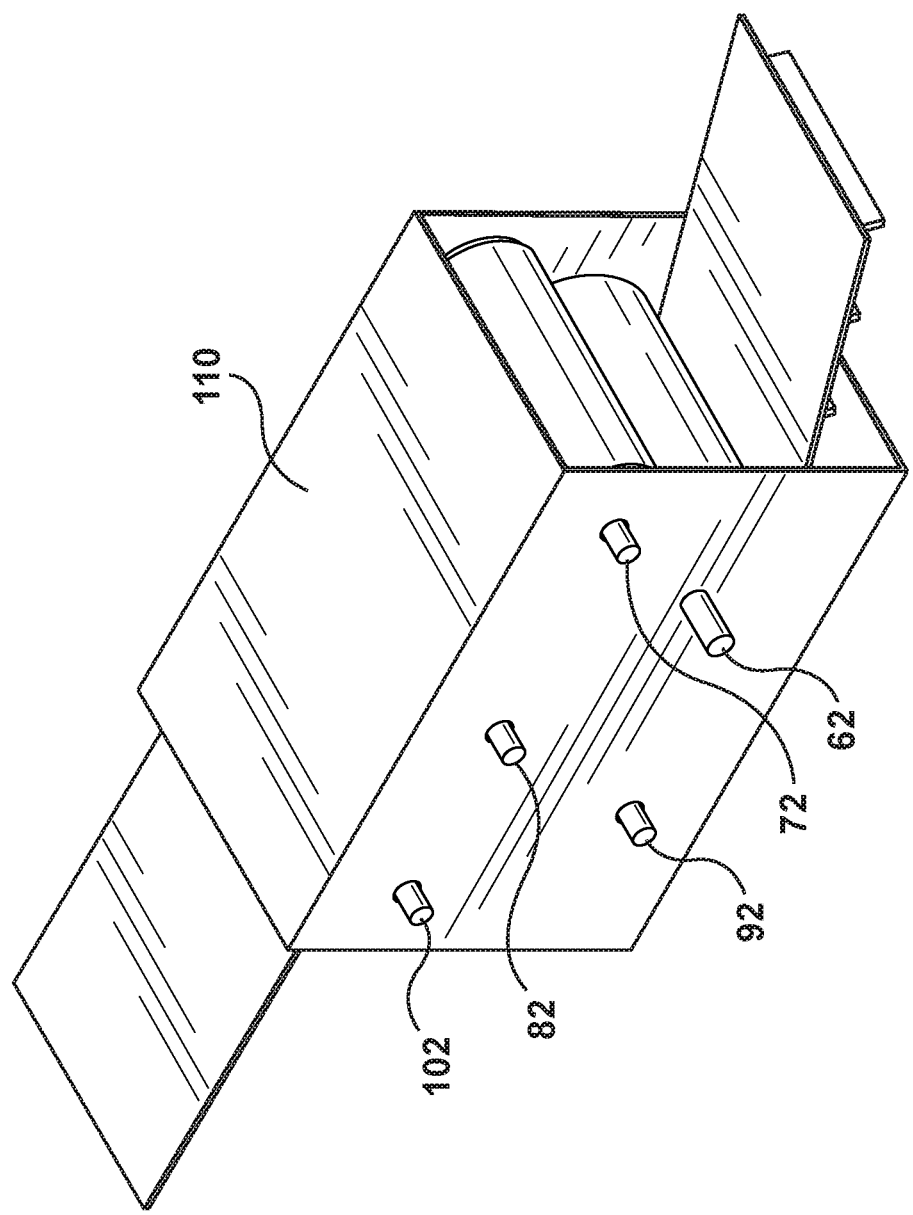

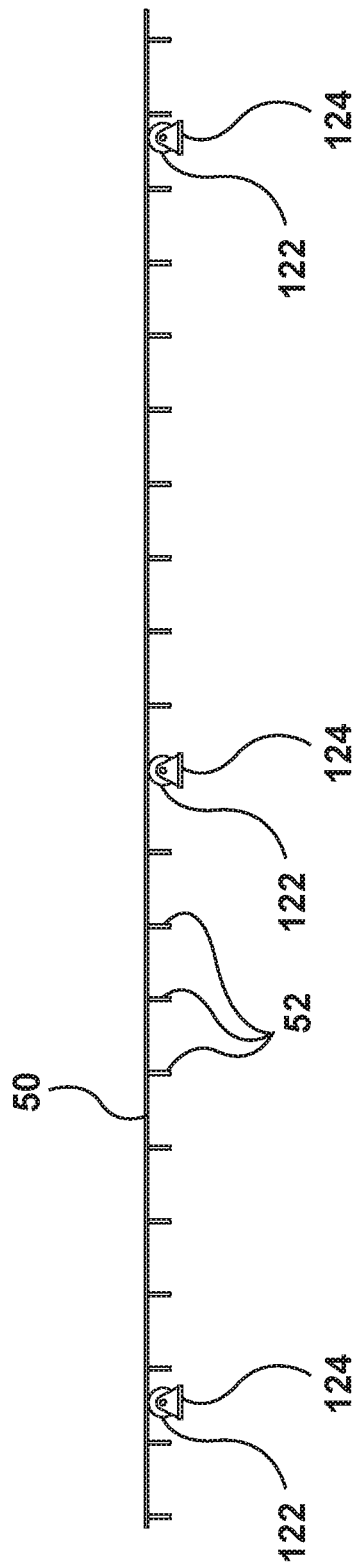
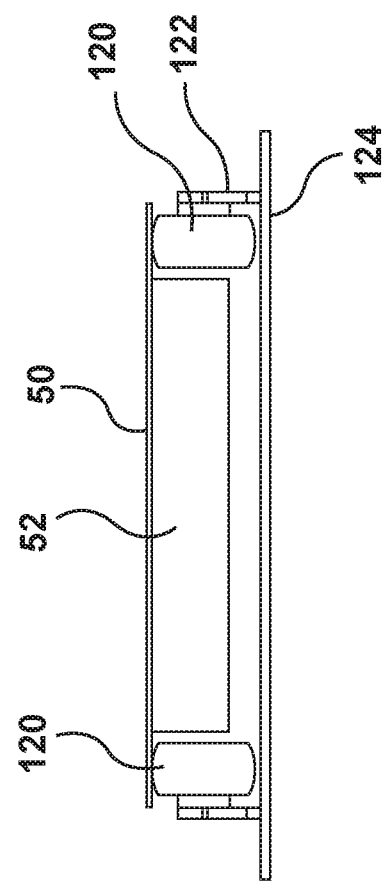
FIG. 15
FIG. 16

DRIVE SYSTEM FOR PADDLE BELT CONVEYOR

CROSS-REFERENCE TO RELATED APPLICATIONS

This application claims priority to U.S. Provisional Patent Application Ser. No. 62/436,170 filed Dec. 19, 2016, and entitled DRIVE SYSTEM FOR PADDLE BELT CONVEYOR, which is herein incorporated by reference in its entirety.

TECHNICAL FIELD

The present invention relates generally to agricultural conveyors for conveying grain or other particulate matter and, more particularly, to belt conveyors.

BACKGROUND

Various types of agricultural machinery employ belt conveyors to move particulate material such as grain or seeds from one location to another. A paddle belt conveyor has a plurality of paddles attached at intervals on one side of a conveyor belt.

The belt conveyor, whether it has paddles or not, may be powered by a power takeoff (PTO) from a tractor or other work vehicle, a gas engine or an electric motor coupled to belts and pulleys, chains and sprockets, or gear drives. A hydraulic drive may alternatively be used to drive the conveyor. The conveyor may run upwardly through a tubular enclosure from a hopper designed to receive the particulate material to a spout that is designed to discharge the material. Alternatively, the conveyor may be a flat-pan conveyor in which the conveyor runs upwardly through a rectangular enclosure. The belt conveyor typically includes a support frame, a hitch and wheels for towing although, in other cases, the conveyor may be rigidly mounted and thus requires no frame or wheels. These types of belt conveyor are commonly used in the agricultural industry to convey grain, seed or other particulate matter from the hopper to the spout such as, for example, in moving grain or seeds from or into a storage bin or to move seeds or grain from or into a storage tank of a vehicle.

Traditionally, to convey particulate matter to greater heights requires longer conveyors. Longer conveyors are usually more expensive, more difficult to maneuver and, when inclined, take up more space in a loading area. Belt slippage and tracking also tend to worsen with increased conveyor length.

Another issue with conveyors is the size and location of the drive system. Conventional drive systems for conveyors tend to be bulky and are designed to be connected to the conveyor at the hopper.

Typical paddle conveyors in use today are driven from the discharge end, by wrapping the belt approximately 180 degrees around a head roller. The friction between the head roller and the back surface of the belt provides the means of power transmission. Conveyors with this type of drive system are limited in their length and/or elevation due to belt slippage.

S-shaped drive systems are used with smooth (non-paddle) belts to increase power transmission by increasing the contact area between the belt and the drive roller (i.e. using a larger drive roller and/or increased angle of belt wrap). An S-drive also allows for the placement of the power source (PTO, gas motor, electric motor, etc.) at a more convenient operating position than the elevated discharge end of the conveyor.

Applicant has recognized that it would be advantageous to provide an S-shaped drive system for a paddle belt conveyor. Developing an S-shaped drive system for paddle belts proved to be a significant technical challenge because a traditional S-shaped drive has rollers which contact both sides of the belt. Accordingly, Applicant realized that a means had to be developed to allow the paddles to pass through the drive, while still providing for sustained contact with both top and bottom surfaces of the conveyor belt. In developing a design for a paddle belt S-drive, other ideas were first tried. One such concept tested by Applicant had a drive roller with slotted openings. The slots were timed with the paddle spacing on the conveyor belt so that the paddles could pass radially inwardly through the driving/contact surface of the drive roller. This concept had limitations because if the belt slipped, or if the belt stretched, the timing would be disrupted causing the paddles and driving surface of the roller to come in contact.

Accordingly, it would be highly desirable to provide an efficient and compact drive system, whether having an S shape or not, for use with a paddle belt conveyor.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

There are various inventive aspects of this disclosure. One main aspect is a drive system for a paddled belt conveyor having a drive roller and a pinch roller, one of which is a bobbin roller that includes an internal space to accommodate the paddles of the belt as the belt passes over the bobbin roller. Specific aspects of the disclosure are now summarized below.

The present specification discloses an S-shaped drive system for a paddle belt conveyor that has a plurality of paddles mounted to the belt. Disclosed in this specification is a novel mechanism enabling an S-shaped drive to drive a paddle belt thereby increasing power transmission and enabling paddle belts to be used in longer conveyors and/or for increased elevation. This innovative solution also addressed the paddle timing issues noted above by driving the belt with a traditional roller off the back surface of the belt and using bobbin rollers on the paddle side of the belt. The S-shaped drive system provides excellent traction by virtue of its pinching action between the pinching bobbin roller and the drive drum roller. This enables the conveyor to operate at steeper than normal angles of inclination, thereby using less space in the loading area. Moreover, the S-shaped drive system is both compact and connectable at any location between the hopper and the spout.

One inventive aspect of the disclosure is a drive system for a paddle belt conveyor. The drive system has a drive shaft and a driven drum roller rotationally driven by the drive shaft about a first axis. The drive system includes a pinching bobbin roller mounted rotationally about a second axis parallel to the first axis, the pinching bobbin roller pinching the conveyor belt between the pinching bobbin roller and the driven drum roller. The drive system also includes a first idler bobbin roller rotatable about a third axis parallel to the first axis and a take-up drum roller rotatable about a fourth axis parallel to the first axis. The drive system includes a second idler bobbin roller rotatable about a fifth axis parallel to the first axis.

Another inventive aspect of the disclosure is a paddle belt conveyor comprising a conveyor belt, a plurality of paddles connected to the conveyor belt and an S-shaped drive system. The drive system includes a drive shaft, a driven drum roller rotationally driven by the drive shaft about a first axis, a pinching bobbin roller mounted rotationally about a second axis parallel to the first axis, the pinching bobbin roller pinching the conveyor between the pinching bobbin roller and the driven drum roller, a first idler bobbin roller rotatable about a third axis parallel to the first axis, a take-up drum roller rotatable about a fourth axis parallel to the first axis and a second idler bobbin roller rotatable about a fifth axis parallel to the first axis.

Yet another inventive aspect of the disclosure is a method of conveying particulate matter on a paddle belt conveyor. The method entails driving a drive shaft to rotate a driven drum roller about a first axis to thereby move a conveyor belt of the paddle belt conveyor, the conveyor belt thus causing rotation of a pinching bobbin roller about a second axis parallel to the first axis, the pinching bobbin roller pinching the conveyor between the pinching bobbin roller and the driven drum roller. The conveyor belt further causes rotation of a first idler bobbin roller about a third axis parallel to the first axis. The conveyor belt further causes a take-up drum roller to rotate about a fourth axis parallel to the first axis. The conveyor belt further causes a second idler bobbin roller to rotate about a fifth axis parallel to the first axis.

A further inventive aspect of the disclosure is a drive system for a paddle belt conveyor comprises a drive shaft and a drive roller rotationally driven by the drive shaft about a first axis. The drive roller exerts traction on a belt of the belt conveyor. The belt comprises a plurality of paddles. The drive system includes a pinch roller mounted rotationally about a second axis parallel to the first axis. The pinch roller pinches the belt between the pinch roller and the drive roller to augment the traction of the drive roller on the belt. The drive system further includes a take-up roller rotatable about a third axis parallel to the first axis, a first idler roller rotatable about a fourth axis parallel to the first axis, and a second idler roller rotatable about a fifth axis parallel to the first axis.

A further inventive aspect of the disclosure is a paddle belt conveyor comprising a conveyor belt having a plurality of paddles and a drive system for driving the belt. The drive system includes a drive shaft and a drive roller rotationally driven by the drive shaft about a first axis, the drive roller exerting traction on a belt of the belt conveyor, wherein the belt comprises a plurality of paddles. The drive system includes a pinch roller mounted rotationally about a second axis parallel to the first axis, the pinch roller pinching the belt between the pinch roller and the drive roller to augment the traction of the drive roller on the belt. The drive system includes a take-up roller rotatable about a third axis parallel to the first axis, a first idler roller rotatable about a fourth axis parallel to the first axis and a second idler roller rotatable about a fifth axis parallel to the first axis.

A further inventive aspect of the disclosure is a method of conveying particulate matter on a paddle belt conveyor. The method comprises driving a drive shaft to rotate a drive roller about a first axis to thereby move a conveyor belt of the paddle belt conveyor and pinching the belt between the pinch roller and the drive roller to augment the traction of the drive roller on the belt using a pinch roller mounted rotationally about a second axis parallel to the first axis. The method further includes directing the belt using a take-up roller rotatable about a third axis parallel to the first axis, a first idler roller rotatable about a fourth axis parallel to the first axis and a second idler roller rotatable about a fifth axis parallel to the first axis.

Other inventive aspects of the disclosure may become apparent from the detailed description and drawings.

BRIEF DESCRIPTION OF THE DRAWINGS

These and other features of the disclosure will become more apparent from the description in which reference is made to the following appended drawings.

FIG. 4 is an isometric view of the drive system of FIG. 3 covered by a box-like shroud.

FIG. 15 is a side view of the return run.

FIG. 16 is a front view of the return run.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

Conveyor

Figure 1:
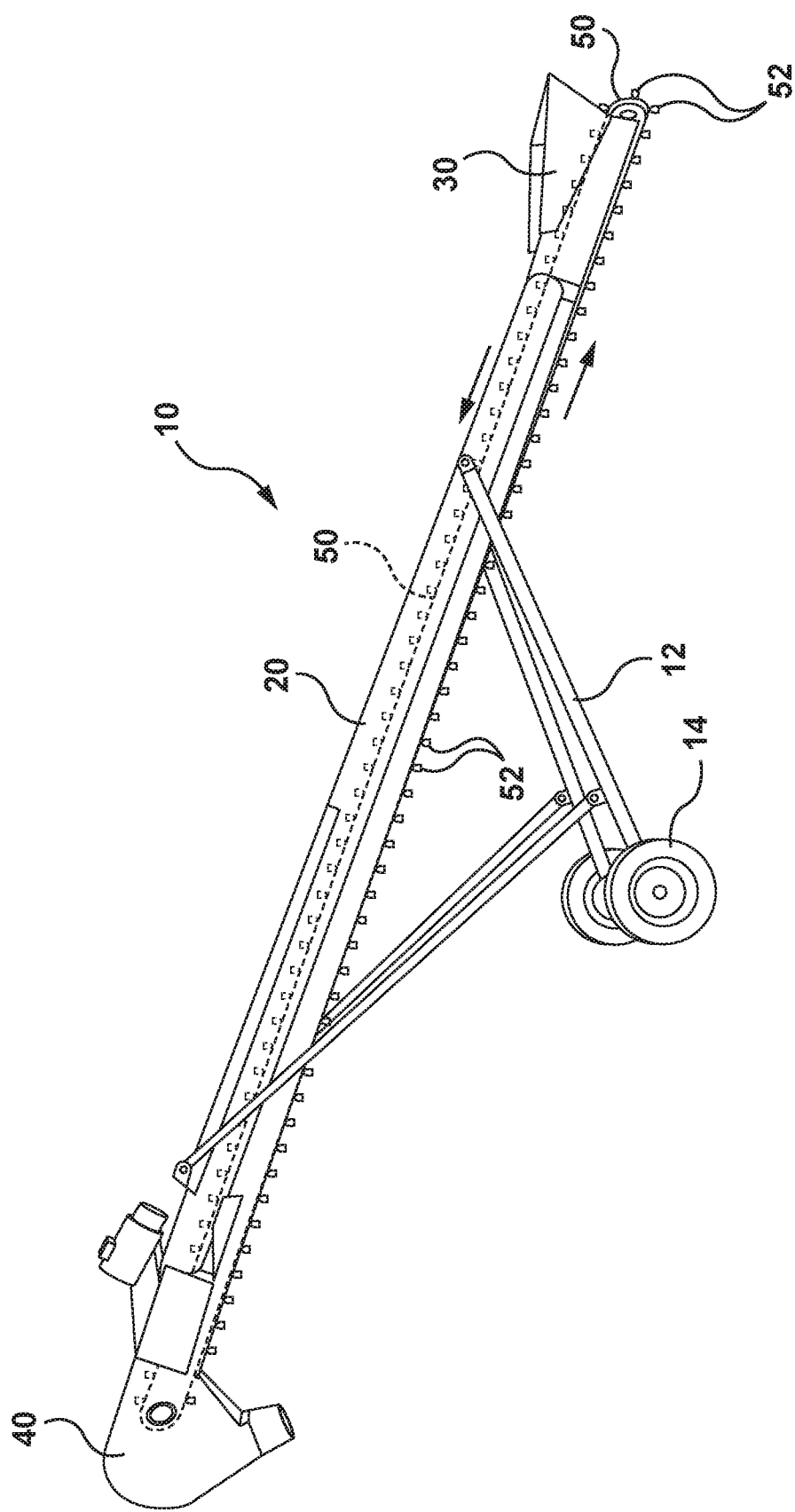
FIG. 1 is side view of an inclined tubular conveyor that can incorporate the novel drive system in accordance with an embodiment of the present invention.

An exemplary embodiment of the conveyor is depicted schematically in FIG. 1. It should be understood that this exemplary embodiment represents only one way of implementing this technology. In other words, variations, modifications and refinements may be made to the system presented herein without departing from the fundamental inventive concept or concepts that are disclosed in this specification.

In the embodiment shown by way of example in FIG. 1, a conveyor generally denoted by reference numeral 10 includes a frame 12, a pair of wheels 14, an inclined tube 20, an intake or hopper 30 and a discharge or spout 40. The conveyor includes a belt 50 to which are attached a plurality of paddles 52. The belt may be made of canvas or other equivalent material. The paddles are made of rubber or any other equivalent material. The paddles are spaced at regular intervals on the belt. The conveyor shown in FIG. 1 may be driven by an S-shaped drive system whose structure and functionality will now be described below.

S-Shaped Drive System

Figure 2:
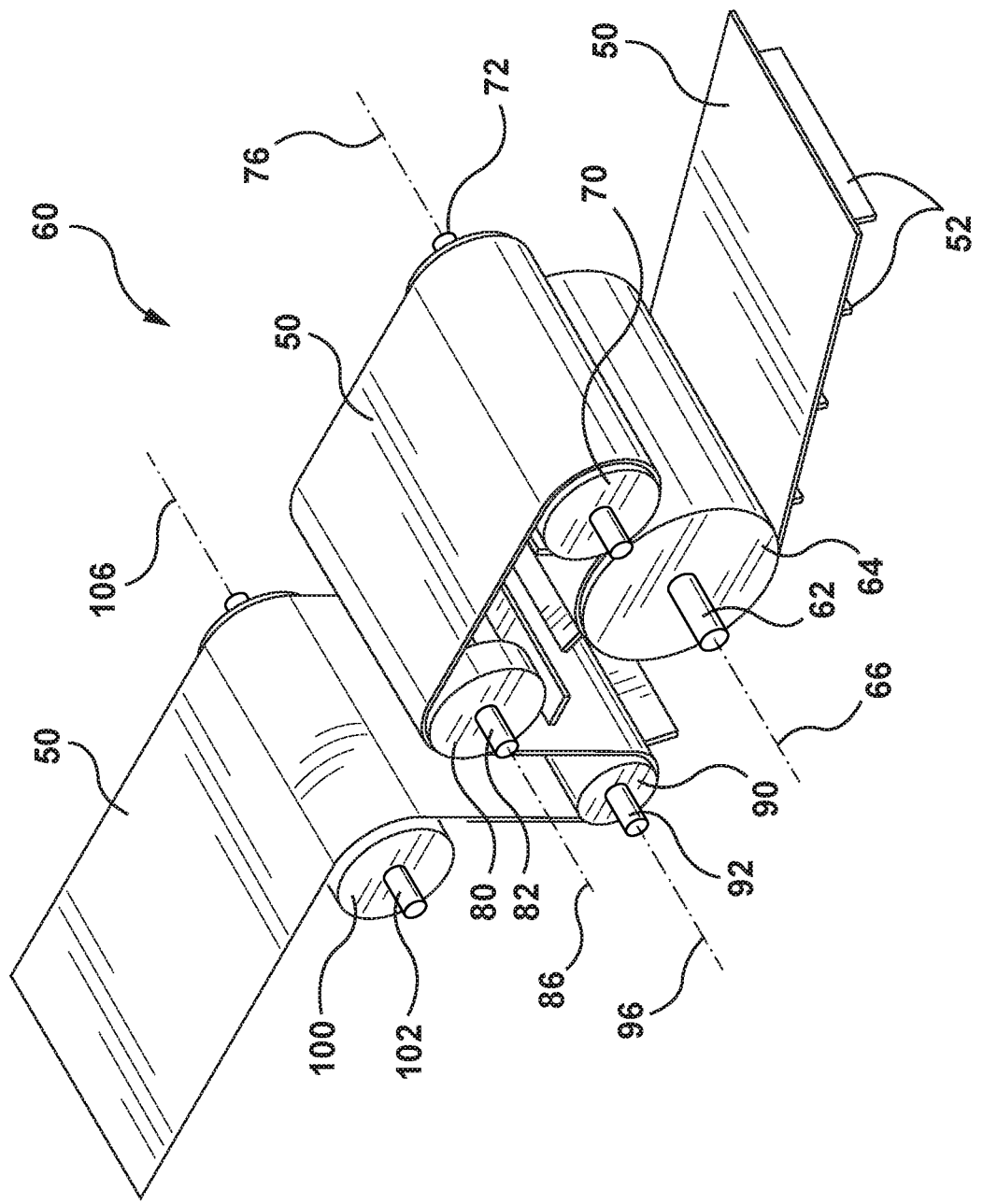
FIG. 2 is an isometric view of the drive system in accordance with an embodiment of the present invention.
Figure 3:
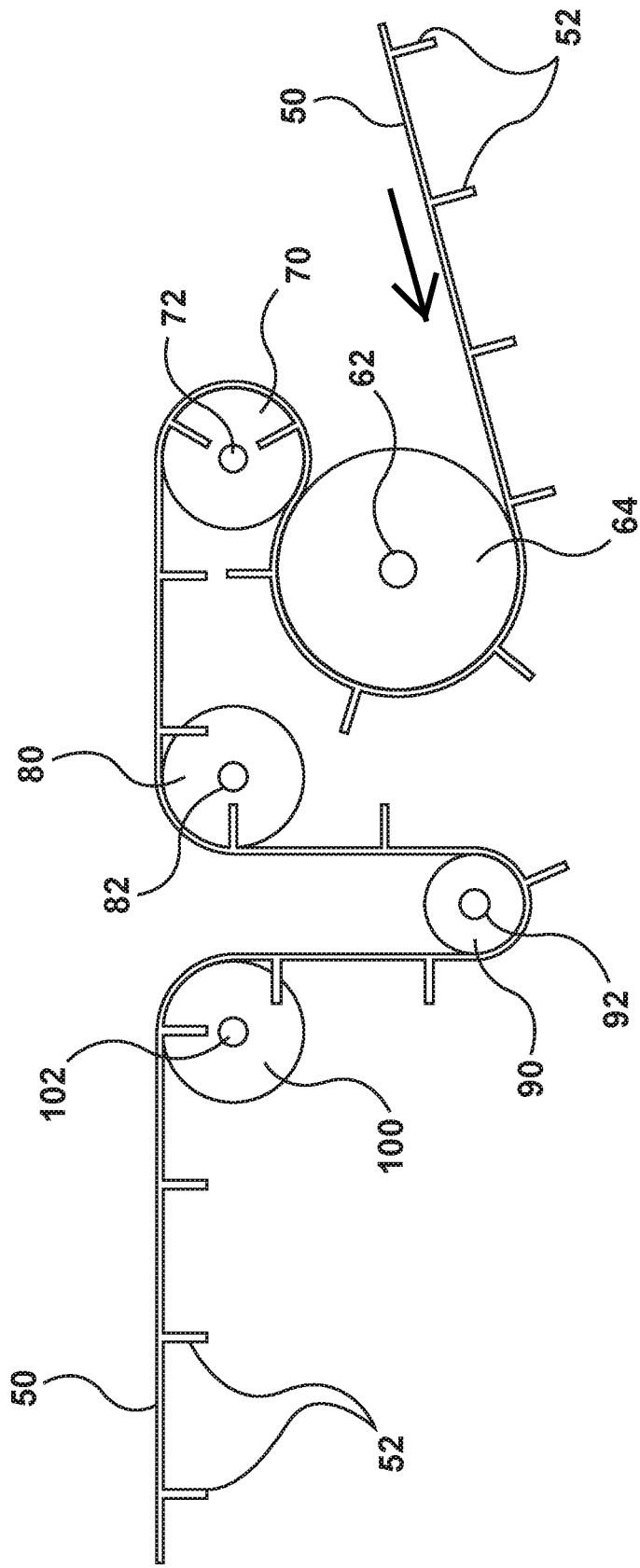
FIG. 3 is a side view of the drive system.

Shown by way of example in FIGS. 2 and 3 is an S-shaped drive system 60 in accordance with one embodiment of the present invention. The drive system 60 has a drive shaft 62 and a driven drum roller 64 rotationally driven by the drive shaft about a first axis 66. The drive system 60 includes a pinching bobbin roller 70 having a shaft 72 mounted rotationally about a second axis 76 parallel to the first axis, the pinching bobbin roller pinching the conveyor between the pinching bobbin roller and the driven drum roller. The drive system 60 also includes a first idler bobbin roller 80 having a shaft 82 rotatable about a third axis 86 parallel to the first axis. The drive system 60 further includes a take-up drum roller 90 having a shaft 92 rotatable about a fourth axis 96 parallel to the first axis. The drive system 60 further includes a second idler bobbin roller 100 having a shaft 102 rotatable about a fifth axis 106 parallel to the first axis. The drum rollers are cylindrical drums of constant diameter whereas the bobbins have shafts supporting larger disk-like guides. The structure of the bobbins will be described in greater detail below.

The driven drum roller 64 is driven by the drive shaft 62 which may be connected to, for example, to a prime mover such as a power takeoff (PTO) shaft of a tractor or work vehicle or an output shaft of a standalone powerplant, such as gas engine, electric motor or hydraulic drive.

In operation, the back side (i.e. non-paddle side) of the belt 50 is pulled over the driven drum roller 64 by friction. The pinching bobbin roller 70 pinches the belt 50 against the driven drum roller 64 and forces additional belt wrap on the drum roller. The pinching of the rollers also provides additional friction to help pull the belt 50. This drive system 60 gets significantly more traction than a top or bottom drive due to the extra wrap and pinch. This significantly reduces the amount of slippage between the driven drum roller 64 and the belt 50. This drive system enables longer conveyors to operate at steeper angles than what is conventionally feasible.

In the illustrated embodiment, the pinching bobbin roller 70, the first idler bobbin roller 80 and the second idler bobbin roller 100 have a same diameter although in other embodiments the diameters may be all different or in yet other embodiments only two of the three bobbin rollers have the same diameter. In the illustrated embodiment, as shown in FIG. 3, the shafts 72, 82, 102 are aligned. Since the diameters of the bobbin rollers are identical in this embodiment, the span of belt between the pinching bobbin roller 70 and the first idler bobbin roller 80 is in the same plane as the span of belt between the first idler bobbin roller 80 and the second idler bobbin roller 100. It will be appreciated that the illustrated geometry may be varied without departing from the inventive concept.

In the illustrated embodiment, the driven drum roller has a larger diameter than the diameter of the pinching bobbin roller, the first idler bobbin roller and the second idler bobbin roller.

In the illustrated embodiment, the take-up drum roller has a diameter smaller than the diameter of the pinching bobbin roller, the first idler bobbin roller and the second idler bobbin roller. The take-up drum roller may be adjustable in height to regulate the amount of tension in the belt.

In another embodiment depicted in FIG. 4, the drive system 60 is covered or enshrouded by a box-like shroud 110 to support and protect the drive system.

Figure 5:
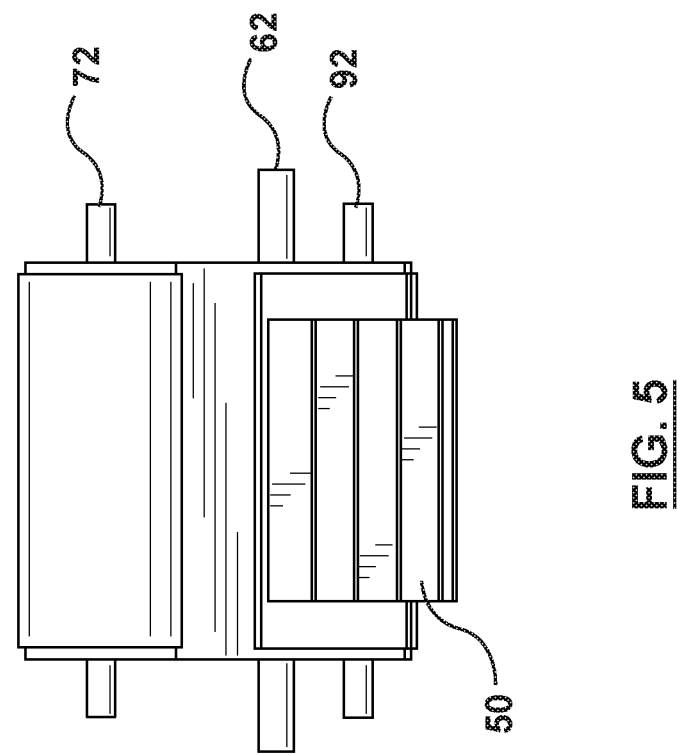
FIG. 5 is a front view of the drive system.

As shown by way of example in FIG. 5, when the drive system is viewed from the front, the vertical distance between the drive shaft 62 of the driven drum roller 64 and the shaft 92 of the take-up drum roller 90 is less than the vertical distance between the drive shaft 62 and the shaft 72 of the pinching bobbin roller 70.

Figure 6:
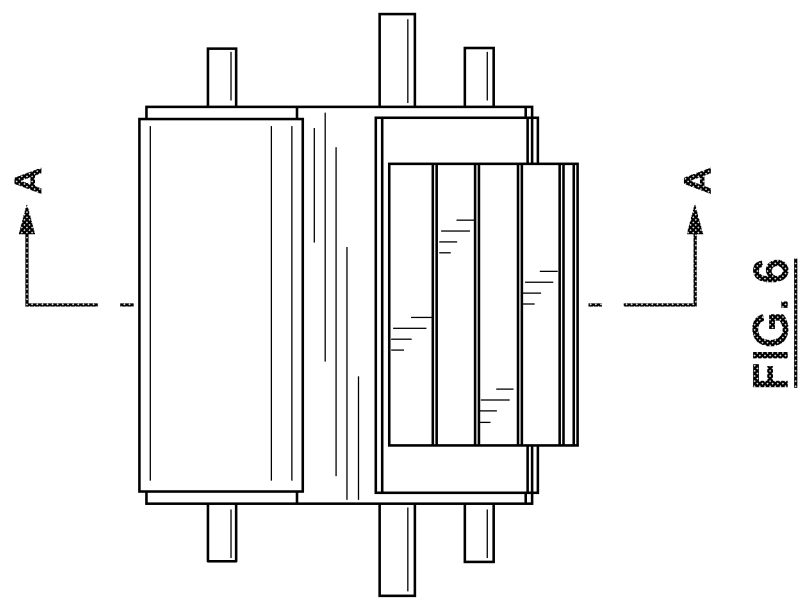
FIG. 6 is a front view of the drive system with a sectional line A-A.
Figure 7:
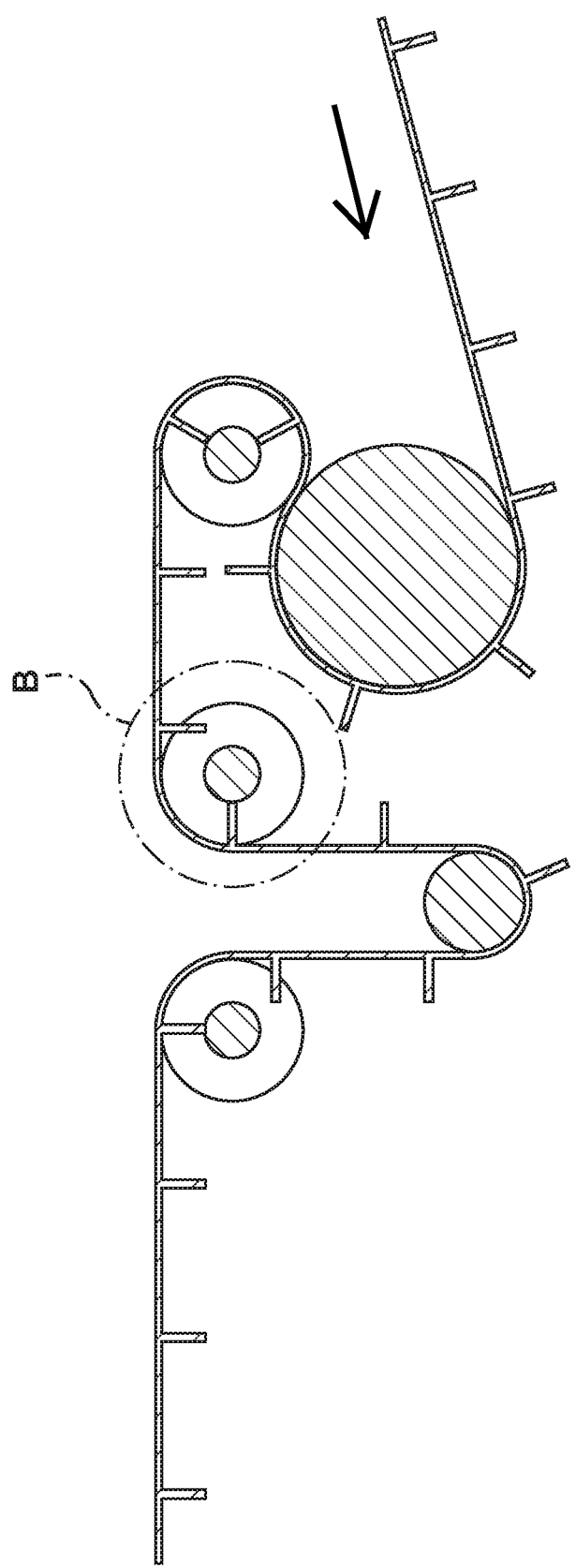
FIG. 7 is cross-sectional view through section A-A.
Figure 8:
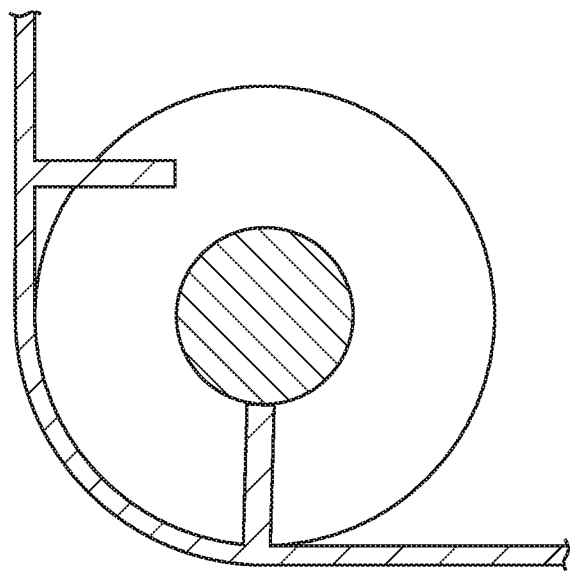
FIG. 8 is a detailed view of detail B shown in FIG. 7.

FIGS. 6-8 depict how the paddle belt moves through the S-shaped drive system. The geometry of the drive system is designed to permit the paddles to move through the drive system without interfering with each other or with the rollers. In these figures, it is shown that the belt wraps around the driven drum roller 64 with the paddles protruding radially outwardly. The belt wraps from the underside more than 180 degrees, as shown in FIG. 7, such that a portion of the belt is traveling in a reverse direction before it is pinched by the pinching bobbin roller 70 after which the belt wraps more than 180 degrees around the pinching bobbin roller 70 to continue in its original direction. The wrapping of the belt around the driven drum roller 64 and the pinching bobbin roller 70 defines an S-shaped path, hence the name S-shaped drive system. It is noted that the paddles point radially inwardly when the belt travels over the pinching bobbin roller 70. The paddles also point radially inwardly when the belt passes over the first idler bobbin roller 80. The paddles of the belt point radially outwardly when the belt passes over the take-up drum roller 90. Finally, the paddles of the belt point radially inwardly when the belt passes over the second idler bobbin roller 100.

Figure 9:
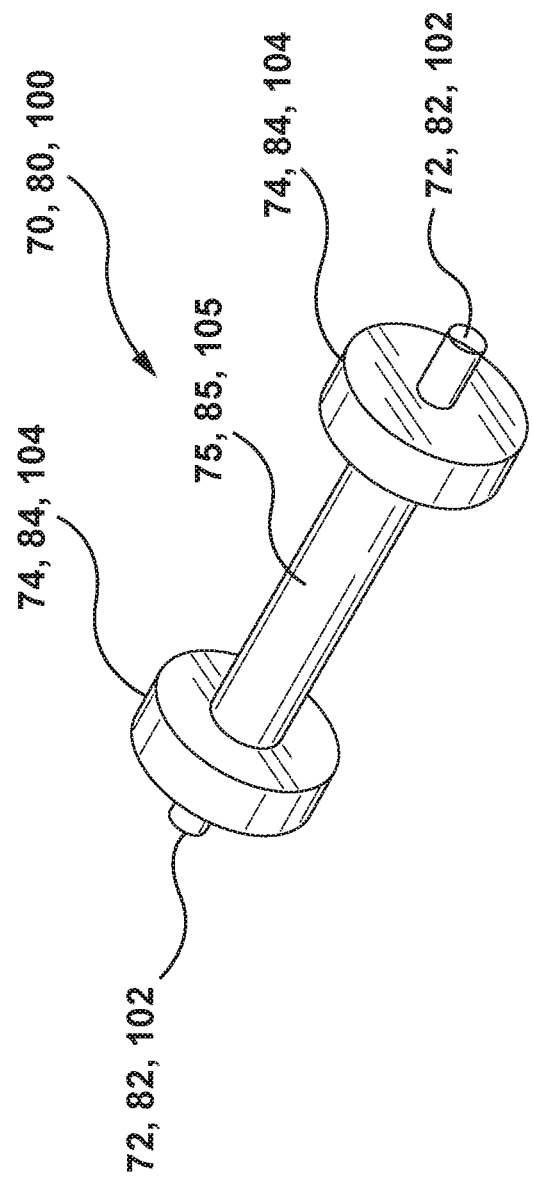
FIG. 9 is an isometric view of a bobbin roller.
Figure 10:
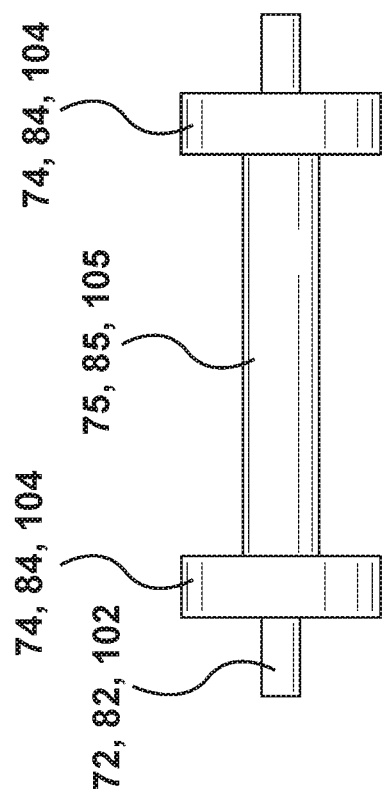
FIG. 10 is a front view of a bobbin roller.
Figure 11:
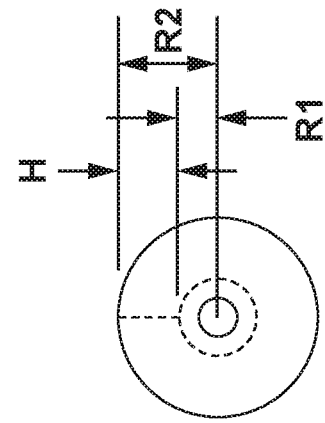
FIG. 11 is a cross-sectional view of a bobbin roller.

As shown by way of example in FIGS. 9-11, each bobbin roller comprises a respective shaft, e.g. the shafts 72, 82, 102 referenced earlier. On each is a sleeve 75, 85, 105 of slightly greater diameter defining an inner radius R1. Supported on each sleeve is a spaced-apart pair of disk-like belt guides 74, 84, 104 defining an outer radius R2, such that a difference between the outer radius R2 and the inner radius R1 is equal to a height H of each of the paddles. In another embodiment, the difference between R2 and R1 is greater than the height H. In yet another embodiment, if the paddles are sufficiently flexible or deformable, the difference between R2 and R1 could even be slightly less than the height H. The pair of disk-like belt guides is spaced apart by a distance slightly greater than the width of each of the paddles.

Figure 12:
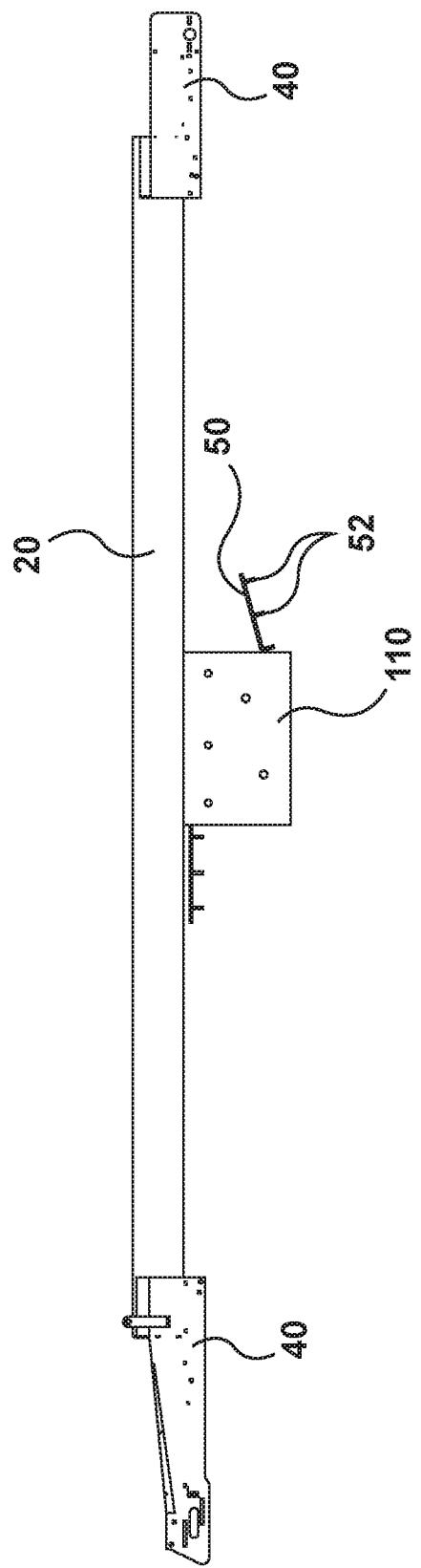
FIG. 12 is a side view of a conveyor having the drive system disposed approximately midway between the hopper and the spout.

FIG. 12 shows the drive system 60 inside the box-like shroud 110 disposed approximately midway between the hopper 30 and the spout 40. The drive system 60 may be attached to an underside of the tube 20 or to any other structure of the conveyor 10. The drive system 60 may be connected anywhere along the conveyor 10, and is not limited to being connected at the hopper 30 or the spout 40.

Figure 13:
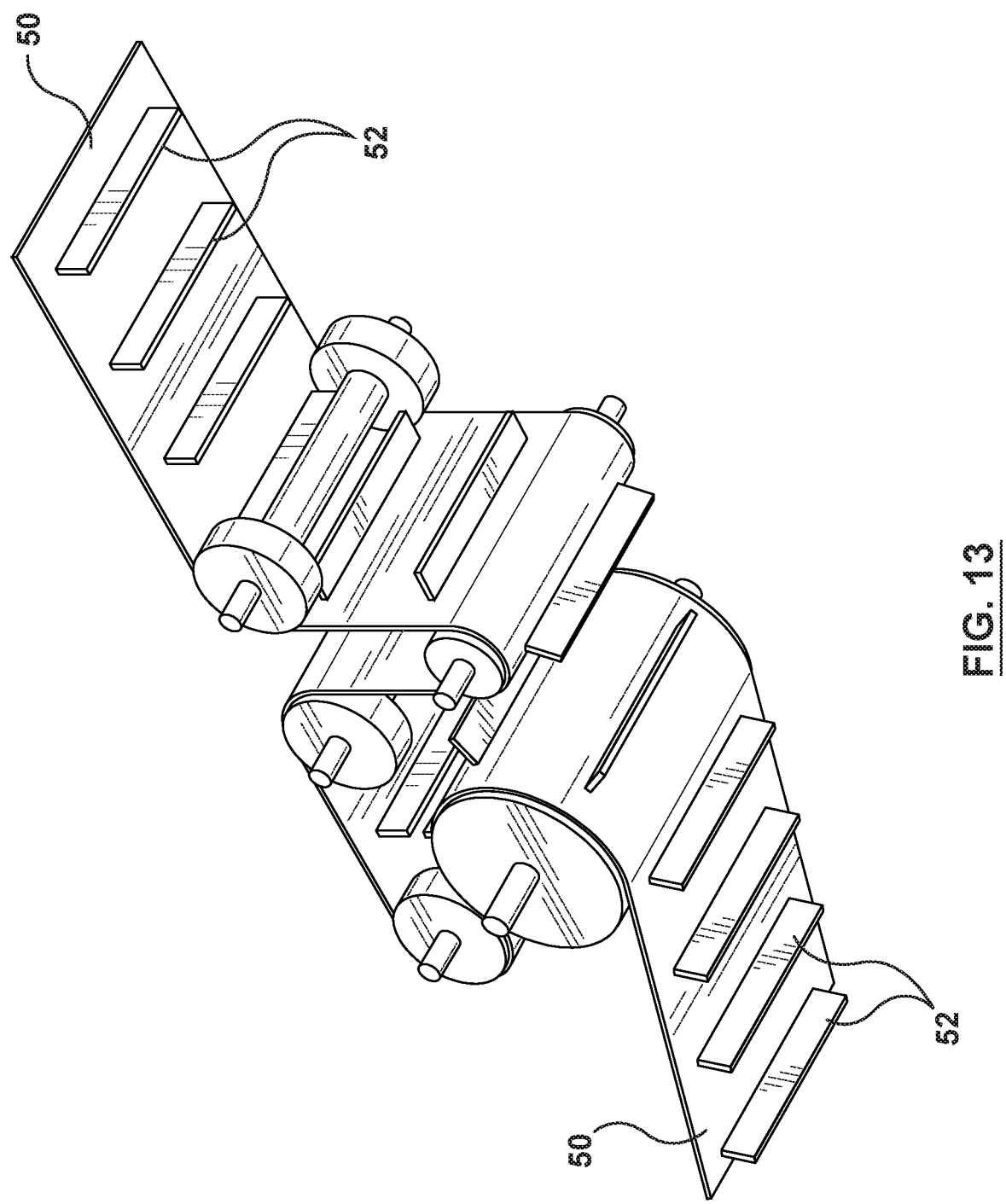
FIG. 13 is an isometric view of the underside of the drive system.

FIG. 13 shows the underside of the S-shaped drive system 60. This figure also shows the compactness of the drive system 60, which is mainly due to the innovative use of bobbin rollers in this context. Using a bobbin roller enables extra wrap on the drive roller 64. This design allows for transition under high tension without the belt pulling into the roller. The three rollers at the back of the drive system act as a vertical spring-loaded take-up. Two rollers are bobbin type and one is a drum roller. This type of take-up mechanism can be moved anywhere along the tube of the conveyor.

Figure 14:
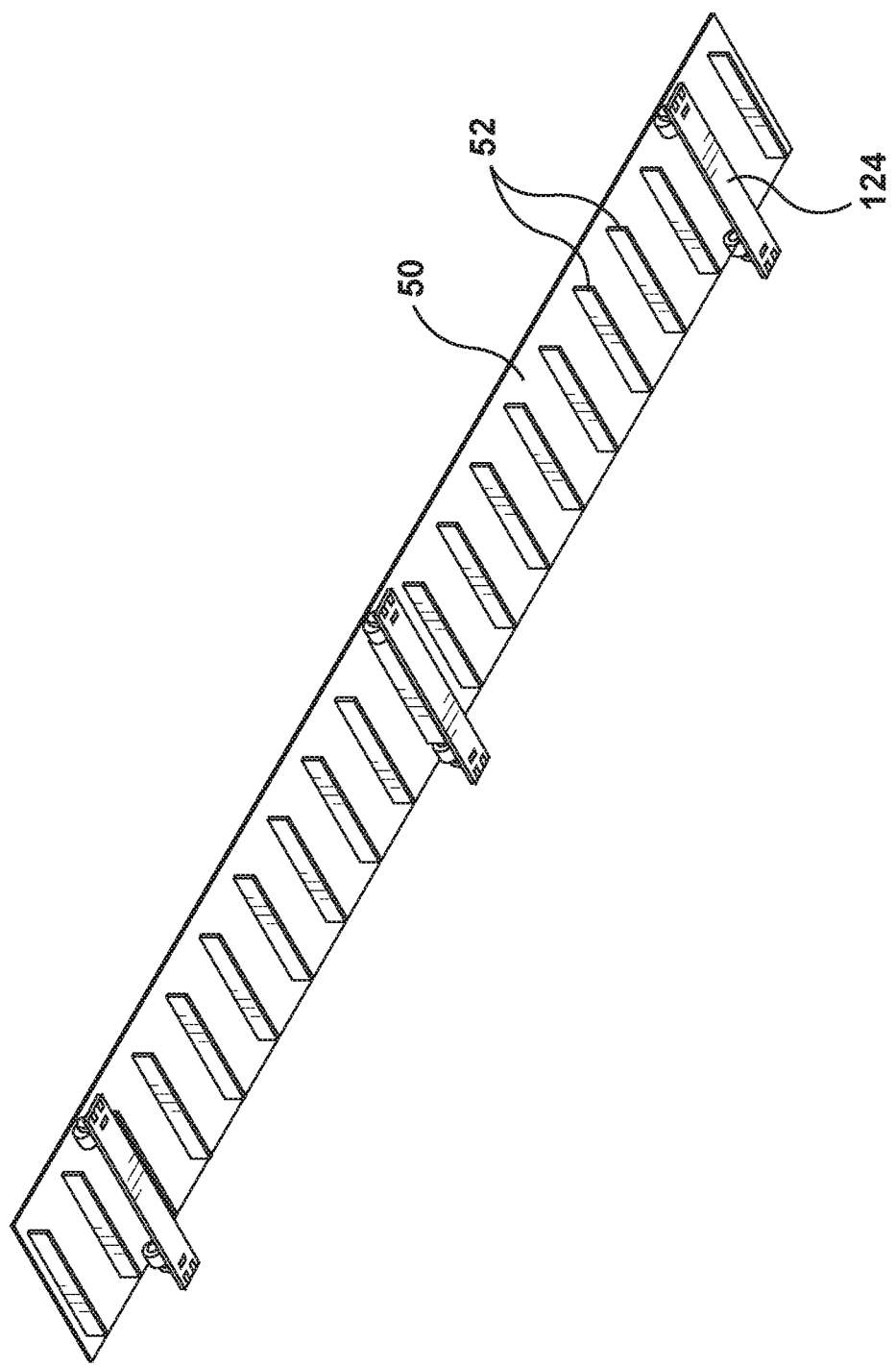
FIG. 14 is an isometric view of the return run of the conveyor.

FIGS. 14-16 depict spaced-apart return rollers 120 for a return run of the conveyor. The return rollers 120 interact with the paddle side of the belt 50. The return rollers 120 are supported by roller supports 122 on a base or bracket 124. The return rollers 120 are spaced apart by a distance greater than a width of each of each of the paddles 52. The return rollers 120 are spaced so as to help track the belt 50. The belt 50 cannot wander very far before the paddle contacts one of the rollers 120. This design for the return run also helps make the conveyor compact.

Method of Conveying Using S-Shaped Drive System

Another inventive aspect of this disclosure is a novel method of conveying particulate matter on a paddle belt conveyor. The method entails conveying particulate matter on a paddle belt conveyor. The method entails driving a drive shaft to rotate a driven drum roller about a first axis to thereby move a conveyor belt of the paddle belt conveyor, the conveyor belt thus causing rotation of a pinching bobbin roller about a second axis parallel to the first axis, the pinching bobbin roller pinching the conveyor between the pinching bobbin roller and the driven drum roller. The conveyor belt further causes rotation of a first idler bobbin roller about a third axis parallel to the first axis. The conveyor belt further causes a take-up drum roller to rotate about a fourth axis parallel to the first axis. The conveyor belt further causes a second idler bobbin roller to rotate about a fifth axis parallel to the first axis.

The method may be performed using an S-shaped drive system in which the pinching bobbin roller, the first idler bobbin roller and the second idler bobbin roller have a same diameter. The method may be performed using an S-shaped drive system in which the driven drum roller has a larger diameter than the diameter of the pinching bobbin roller, the first idler bobbin roller and the second idler bobbin roller. The method may be performed using an S-shaped drive system in which the take-up drum roller has a diameter smaller than the diameter of the pinching bobbin roller, the first idler bobbin roller and the second idler bobbin roller. The method may be performed using an S-shaped drive system in which each bobbin roller comprises a shaft supporting a sleeve defining an inner radius and a spaced-apart pair of disk-like belt guides defining an outer radius, such that a difference between the outer radius and the inner radius is equal to a height of each of the paddles.

In the foregoing methods, the drive shaft, driven drum roller, pinching bobbin roller, first idler bobbin roller, second idler bobbin roller and take-up drum roller may together form a drive system packaged inside a shroud and disposed between a hopper and a spout. The methods may be used to convey grain, seed or any other particulate matter from the hopper to the spout. The methods, though initially conceived for use in the agricultural industry, may also be used to convey particulate matter in other industries.

Modified Drive System

A modified drive system for a paddle belt conveyor that is believed to provide even better performance than the S-shaped drive system of FIGS. 1-16 is depicted by way of example in FIGS. 17-25. In the embodiments depicted in FIGS. 17-25, the modified drive system 200 can be used to drive a conveyor belt 50 in a conveyor 10 such as the one depicted in FIG. 1. The drive system is intended to drive a paddle belt 50 having a plurality of paddles 52 as illustrated in the figures. In the embodiment depicted in FIGS. 17-22, the drive system 200 uses a bobbin-type drive roller 202 to drive the belt 50. Note that the embodiment of FIGS. 17-22 uses a bobbin-type drive roller (or simply "bobbin roller") instead of the drum roller of the embodiment of FIG. 1. In the embodiment of FIGS. 17-22, the bobbin-type drive roller 202 is driven by a drive shaft 204 that provides the torque to rotate the bobbin-type drive roller 202 about a drive shaft axis of rotation. The drive shaft 204 would be directly or indirectly connected, when in operation, to a power takeoff (PTO) output shaft of a tractor or another prime mover (e.g. an internal combustion engine or electric motor) via a torque-transmission mechanism (not shown because such mechanisms are well known in the art). The drive system 200 includes a pinch roller 206 having shaft or axle 207 that rotates about a pinch roller axis of rotation parallel to the drive shaft axis of rotation. The pinch roller 206 as its name implies pinches the belt 50 between the pinch roller 206 and the drive roller 202 as the drive roller and pinch roller are in rolling contact to enable the drive roller 202 to exert maximum traction on the belt. The drive system 200 also includes a take-up drum roller 208 having shaft or axle 209 disposed generally beneath the pinch roller 206 to increase an angle of wrap, further augmenting the traction of the drive roller on the belt. In the embodiment illustrated in FIGS. 17-22, the take-up drum roller 208 is vertically aligned with the pinch roller 206 and is of the same diameter although in other embodiments the take-up drum roller may be vertically offset and/or have a different diameter than the pinch roller.

In the embodiment illustrated in FIGS. 17-22, the drive system 200 includes an idler drum roller 210 having shaft or axle 211 and an idler bobbin roller 212 having shaft or axle 213. The idler bobbin roller 212 has a larger diameter than the idler drum roller 210 in the illustrated embodiment but in another embodiment the idler bobbin roller may be of the same size or smaller. The drive system 200 may also include a guided bobbin roller (idler) 214 having shaft or axle 215. The guided bobbin roller 214 optionally also has a belt-guiding collar 310 which will be further described below. The axes of rotation of the rollers 210, 212, 214 are parallel to each other. These axes of rotation are parallel to the axes of rotation of the other rollers 202, 206, 208. The drive system 200 provides significant traction on the belt due to the pinching effect of the belt between the pinch roller and the drive roller as well as the increased wrap (contact surface) of the belt on the drive roller. The increased wrap (contact surface between the drive roller and the belt) is a result of the improved geometry of the rollers, as shown in FIGS. 17-22, in particular the placement of a take-up roller beneath the pinch roller, which thus enables the pinch roller to be higher (i.e. closer to the incoming belt). The take-up roller directs the belt below the drive roller as shown the figures.

Figure 18:
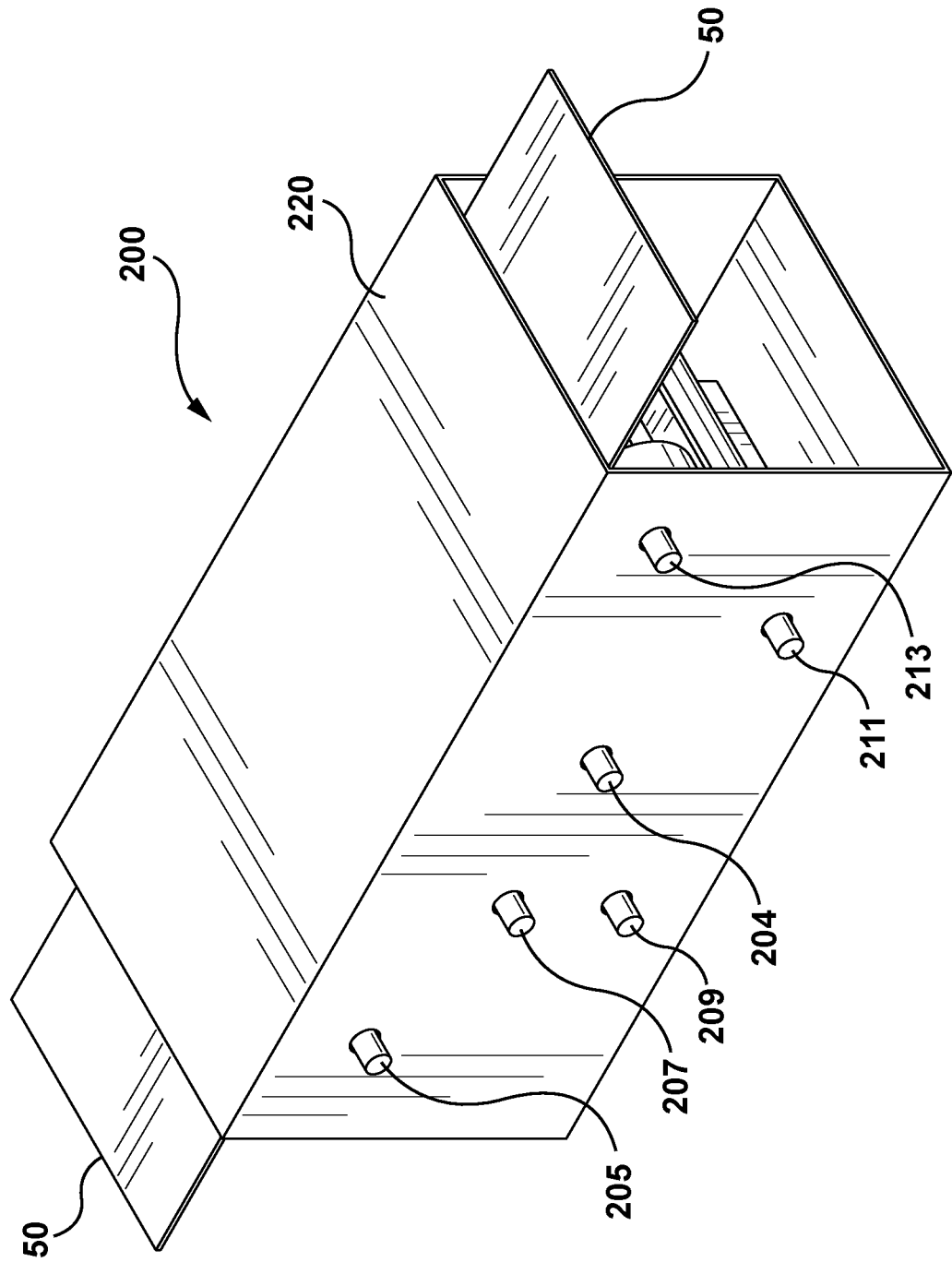
FIG. 18 is an isometric view of the drive system of FIG. 17 covered by a box-like shroud.
Figure 19:
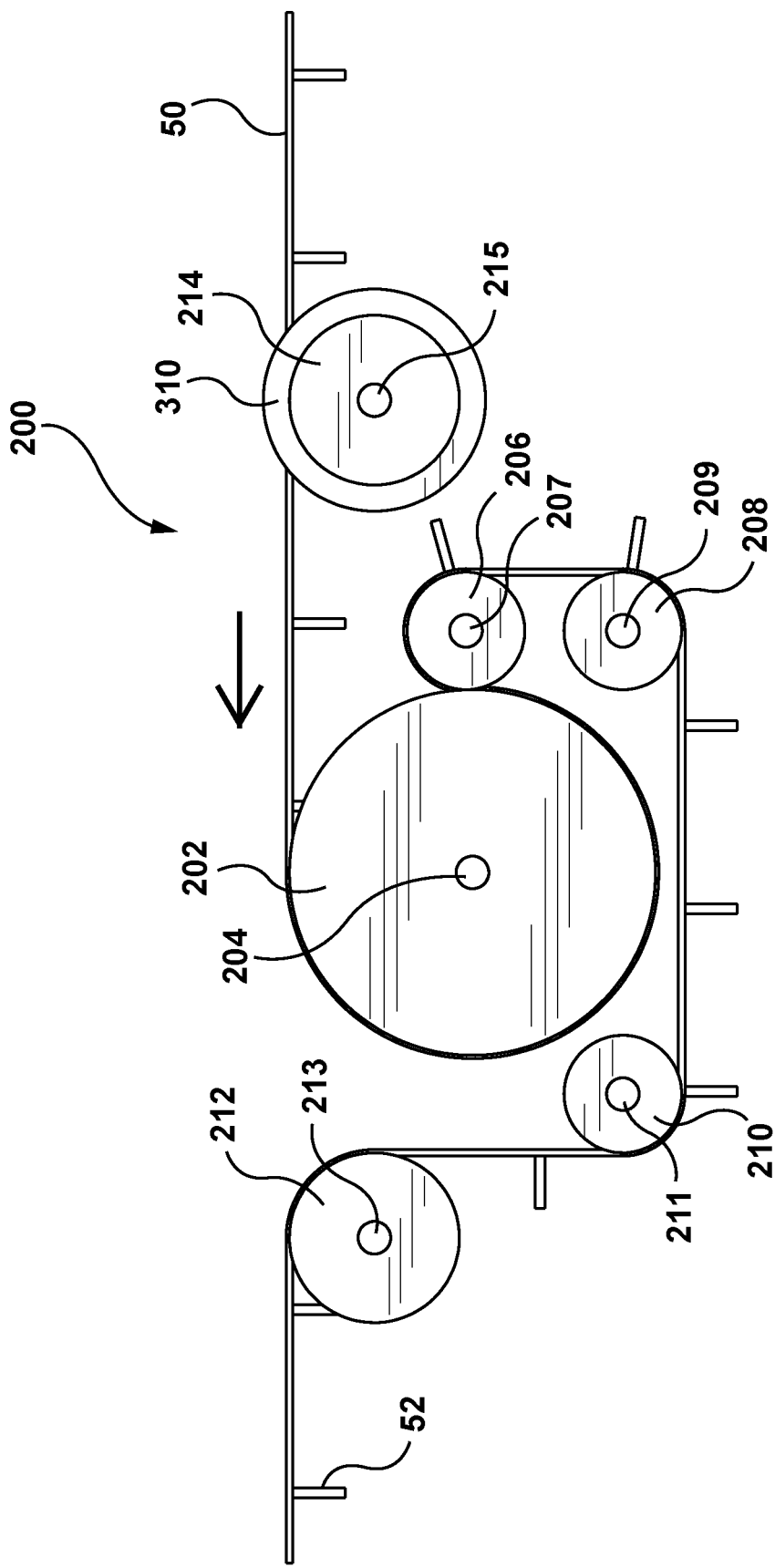
FIG. 19 is a side view of the drive system of FIG. 17.
Figure 20:
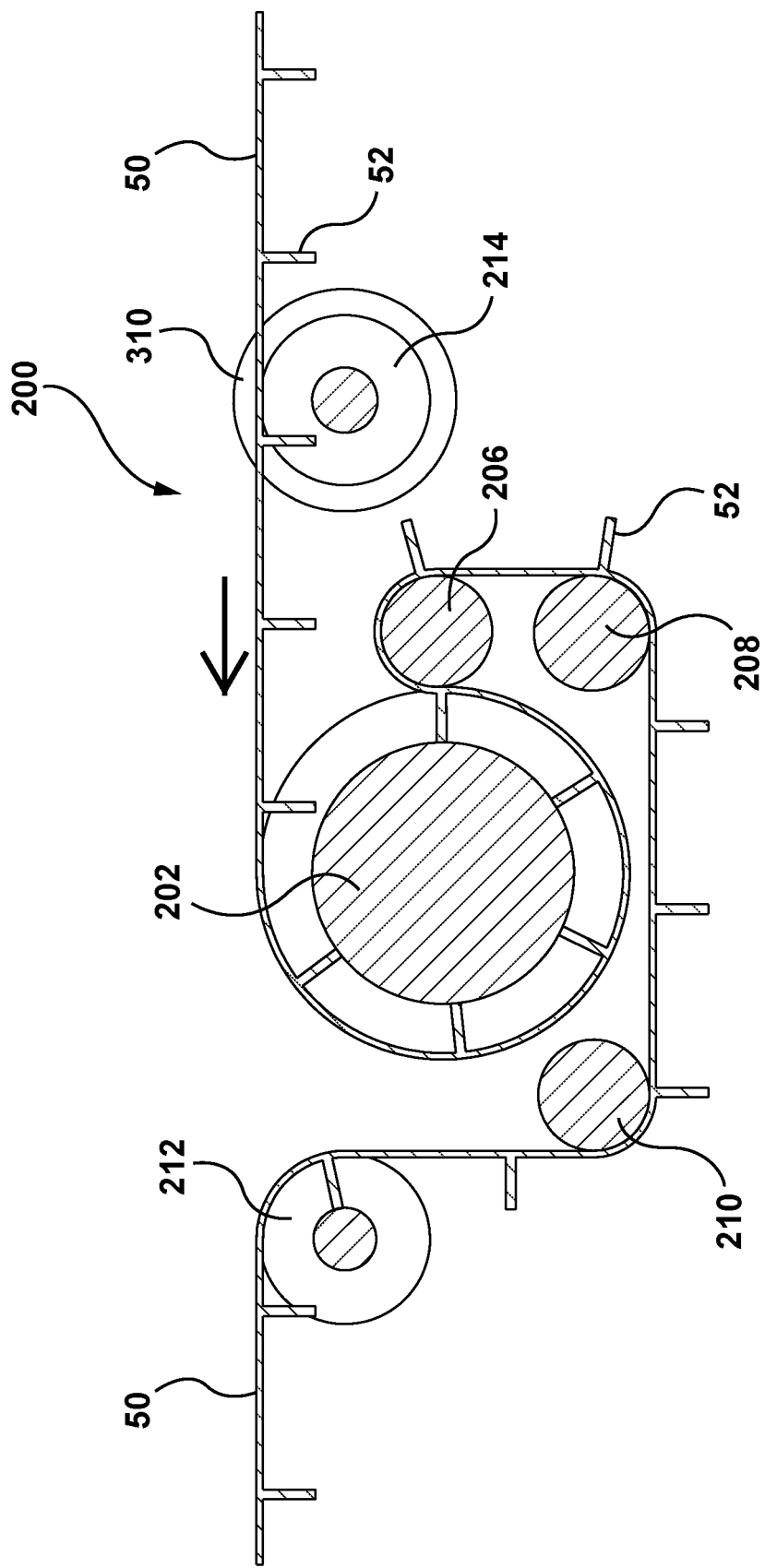
FIG. 20 is a cross-sectional view of the drive system of FIG. 17.
Figure 21:
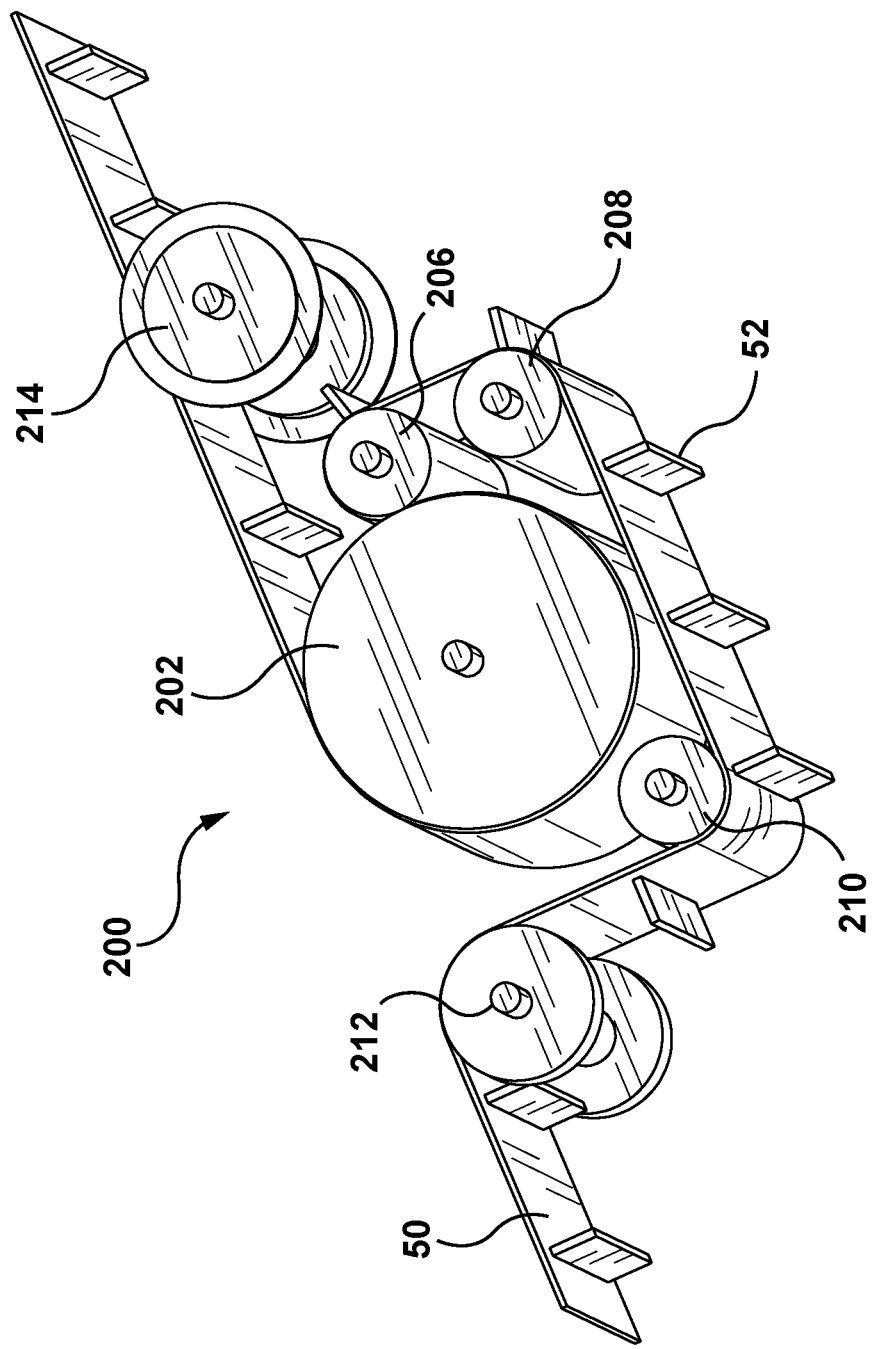
FIG. 21 is another isometric view of the drive system of FIG. 17 viewed from a lower perspective.
Figure 22:
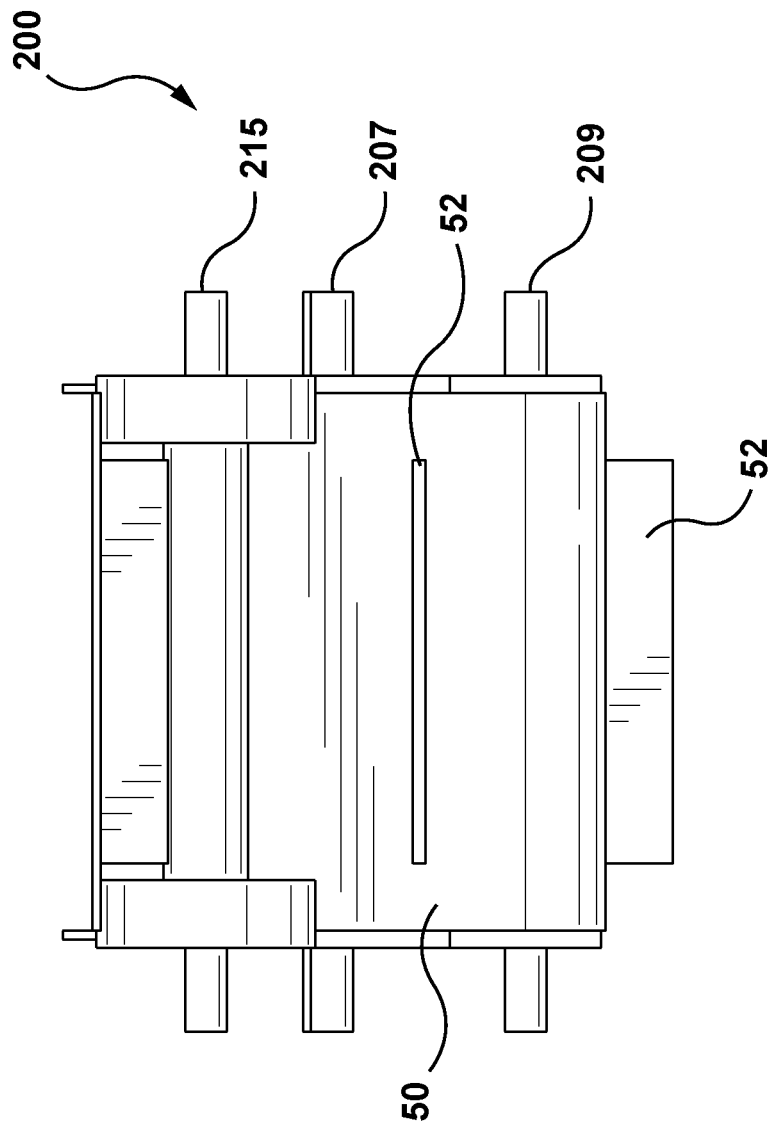
FIG. 22 is a front view of the drive system of FIG. 17.

As depicted by way of example in FIG. 18, the drive system 200 may be enclosed, or partially enclosed, by an optional box-like shroud or cover 220. The cover 220 has an open front and an open rear through which the belt travels.

The drive system 200 is attached to the belt 50 on the return run so that the paddles are generally facing downwardly when the belt reaches the drive system. The paddles are then facing generally upwardly when conveying material on the delivery run. It will be appreciated that the conveyor may also be angled and thus the paddles may be angled downwardly on the return run and angled upwardly on the delivery run depending naturally on the orientation of the conveyor.

In the embodiment depicted in FIGS. 17-22, the span of belt between the guided bobbin roller 214 and the drive roller 202 is aligned in the same plane as the segment of belt rolling off the idler bobbin roller 212. This plane may be called the "main belt plane" of the return run since most of the belt is running along this plane during the return run except for some portions of the belt that are passing through the drive system. The span of belt between the rollers 208, 210 is generally parallel to the aforementioned plane. The span of belt between rollers 210 and 212 is generally orthogonal to this plane. The span of belt between rollers 206 and 208 is likewise orthogonal to this plane. It will be appreciated that the drive system may be configured in other geometries. The drive system 200 depicted by way of example in FIGS. 17-22 is not only effective at providing traction to the belt but it is also a very compact design. The compactness of the design is evident from the figures. To achieve this highly compact design, the rollers need not be arranged exactly as shown. However, in the illustrated embodiment of FIGS. 17-22, which is believed to be the best mode of implementing the invention, the drive roller is larger in diameter than the other rollers. In this particular embodiment, the guided bobbin roller 214 and the idler bobbin roller 212 axles are spaced at the same height relative to the drive shaft or frame of the conveyor and also have the same diameter. Thus, in this embodiment, these two rollers 212, 214 support the belt in the same plane as noted above. In this embodiment, the rollers 207, 209 and 210 have the same diameter. The shafts/axles 207 and 209 are aligned in an orthogonal plane (i.e. orthogonal to the main belt plane). The shafts/axles 209, 211 are aligned in a parallel plane (i.e. parallel to and spaced-apart from the main belt plane). In this embodiment, the belt span between rollers 208 and 210 is greater than the belt span between rollers 206 and 208. In this embodiment, the belt span between the rollers 208 and 210 is also greater than the belt span between rollers 210 and 212. In this embodiment, the belt span between rollers 210 and 212 is greater than the belt span between rollers 206 and 208. Although this geometry is highly compact and provides excellent traction on the belt, it will be appreciated that variations on this geometry may be used to achieve substantially similar results.

Figure 17:
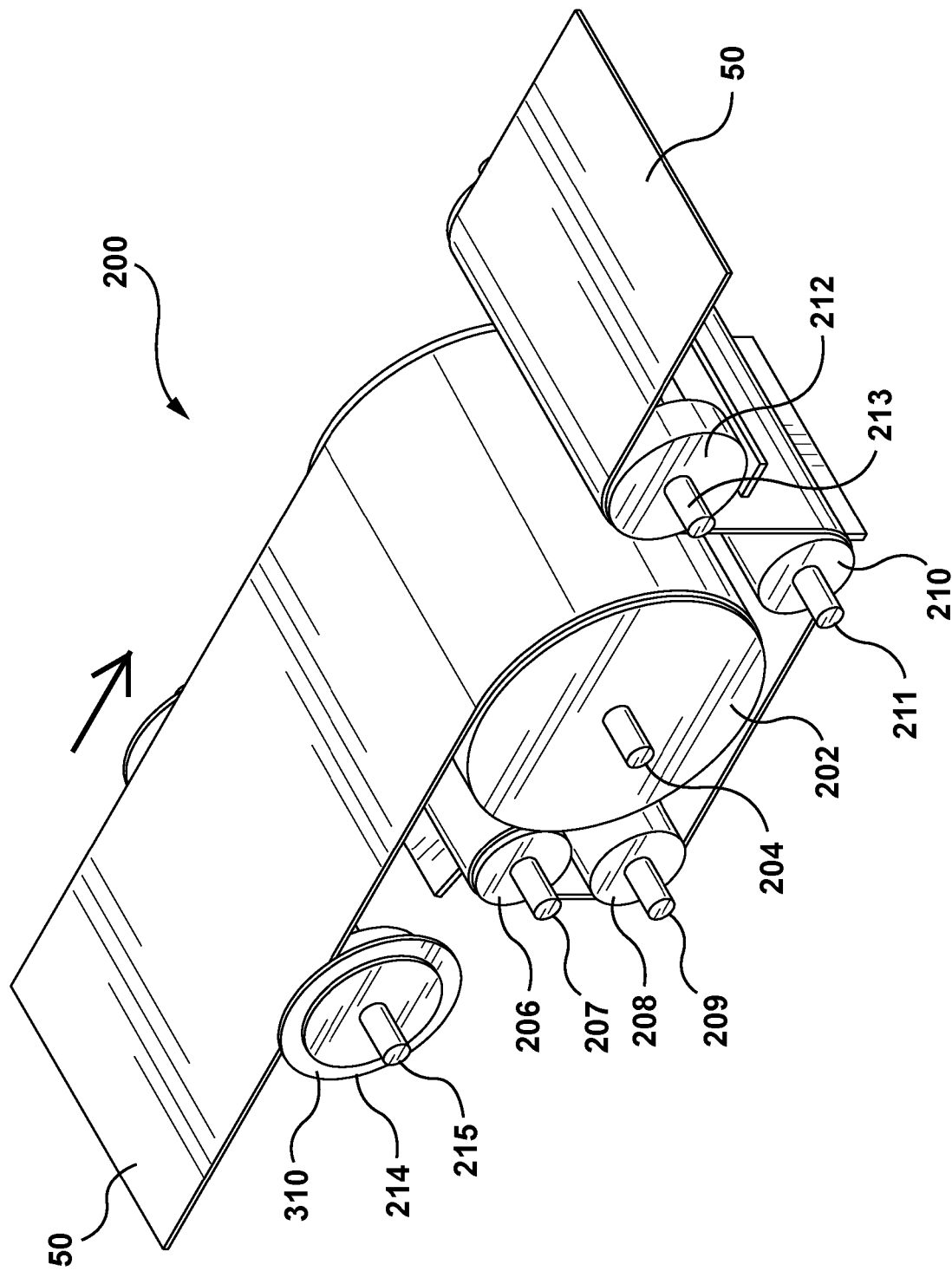
FIG. 17 is an isometric view of a drive system for a belt conveyor in accordance with another embodiment of the present invention.
Figure 23:
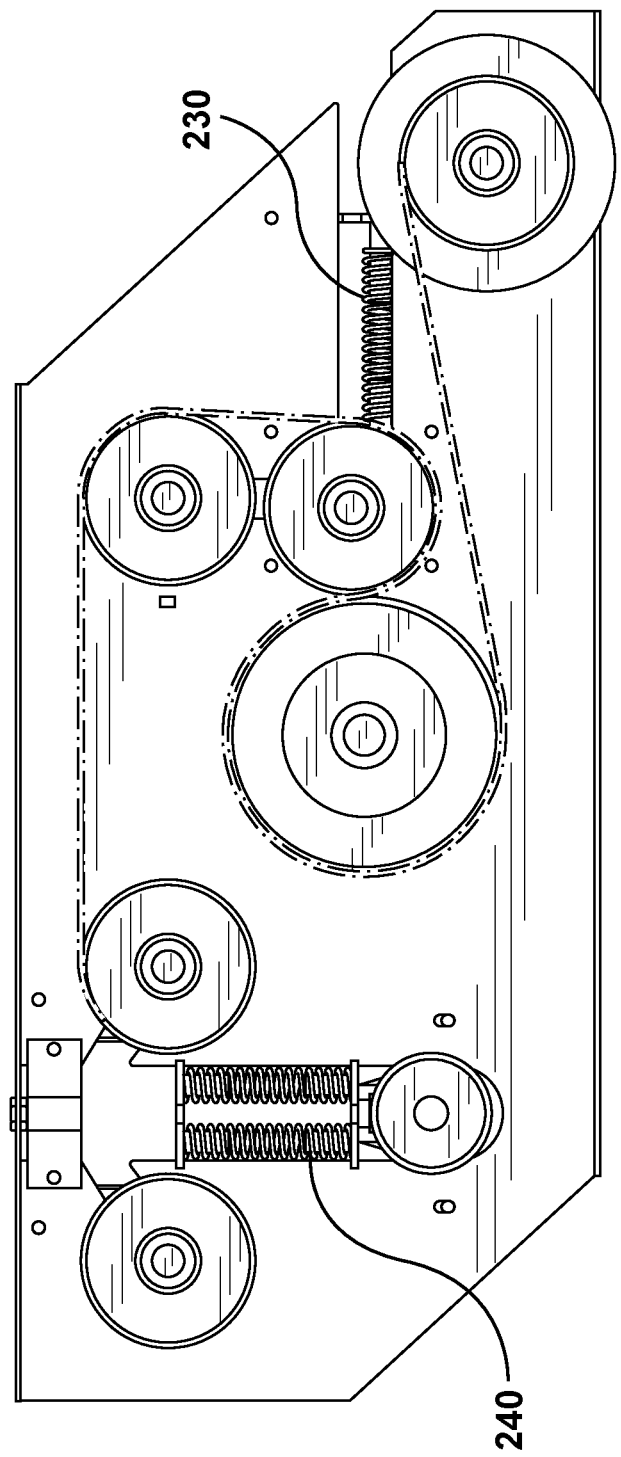
FIG. 23 is a side view of a drive system for a belt conveyor in accordance with another embodiment of the present invention.

FIG. 23 is a side view of a modified drive system of FIG. 17 in which the mechanism has been modified by including springs 230, 240 to increase the force on the take-up and pinch rollers.

Figure 24:
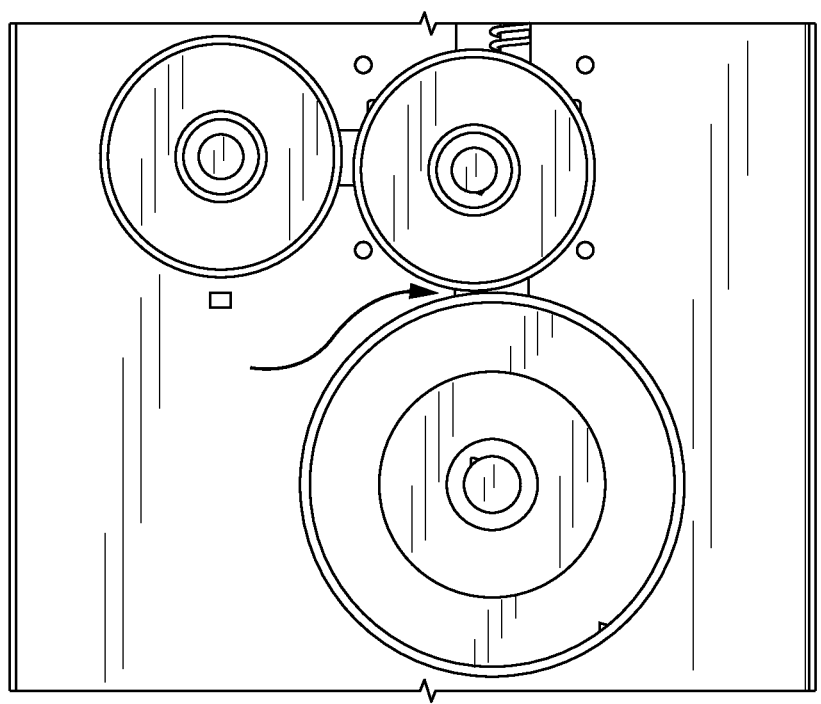
FIG. 24 is a detailed view of a portion of the drive system of FIG. 17 showing the increased wrap exerted by the drive system on the belt conveyor with the improved geometry relative to the embodiment of FIG. 1.

FIG. 24 is a detailed view of a portion of the drive system 200 of FIGS. 17-22 showing the pinching and wrapping effect exerted by the drive system 200 on the belt 50. In the embodiment of FIGS. 17-22, there is approximately 50 degrees more of wrap as compared with the embodiment of FIG. 1. This increased contact between the belt and drive roller results in significantly more traction.

Figure 25:
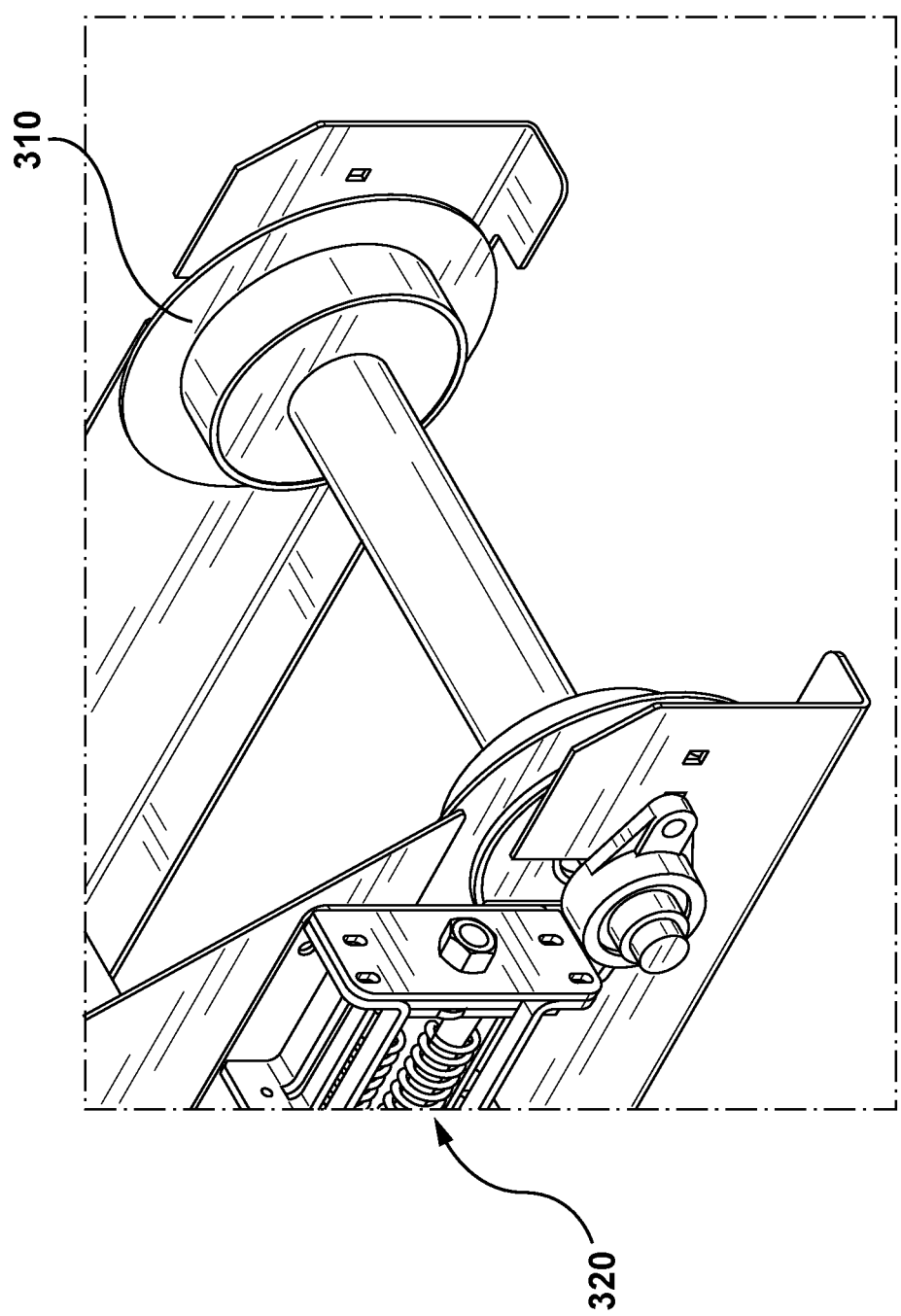
FIG. 25 is an isometric view of a guided spool roller for use in the drive system of FIG. 17 or FIG. 18.

FIG. 25 is an isometric view of a guided spool roller 300 for use in the drive system 200 of FIGS. 17-22, particularly in the bobbin rollers. The guided spool roller 300 includes roller guides or belt-guiding collars 310 in the form of a washer-like collar that acts as an annular shoulder to constrain the belt thus improving the tracking of the belt. FIG. 25 also depicts a belt tensioning mechanism 320 which may be user-adjustable to increase or decrease tension on the belt. In the illustrated embodiments, the drum rollers are cylindrical. The respective shafts or axles of each roller extends through a centerline of the cylindrical body of each roller. In the illustrated embodiments, the bobbin rollers have a narrower cylindrical body with two disc-like rings at each end. This geometry provides a space for the paddles to pass when the belt runs over the bobbin roller. The width of the space formed between the disc-like rings at each end is slightly greater than the width of the paddle. Likewise, the height of the space defined between the outer radius of the narrower cylindrical body and the outer radius of the disc-like rings is slightly larger than the height of the paddles.

Figure 26:
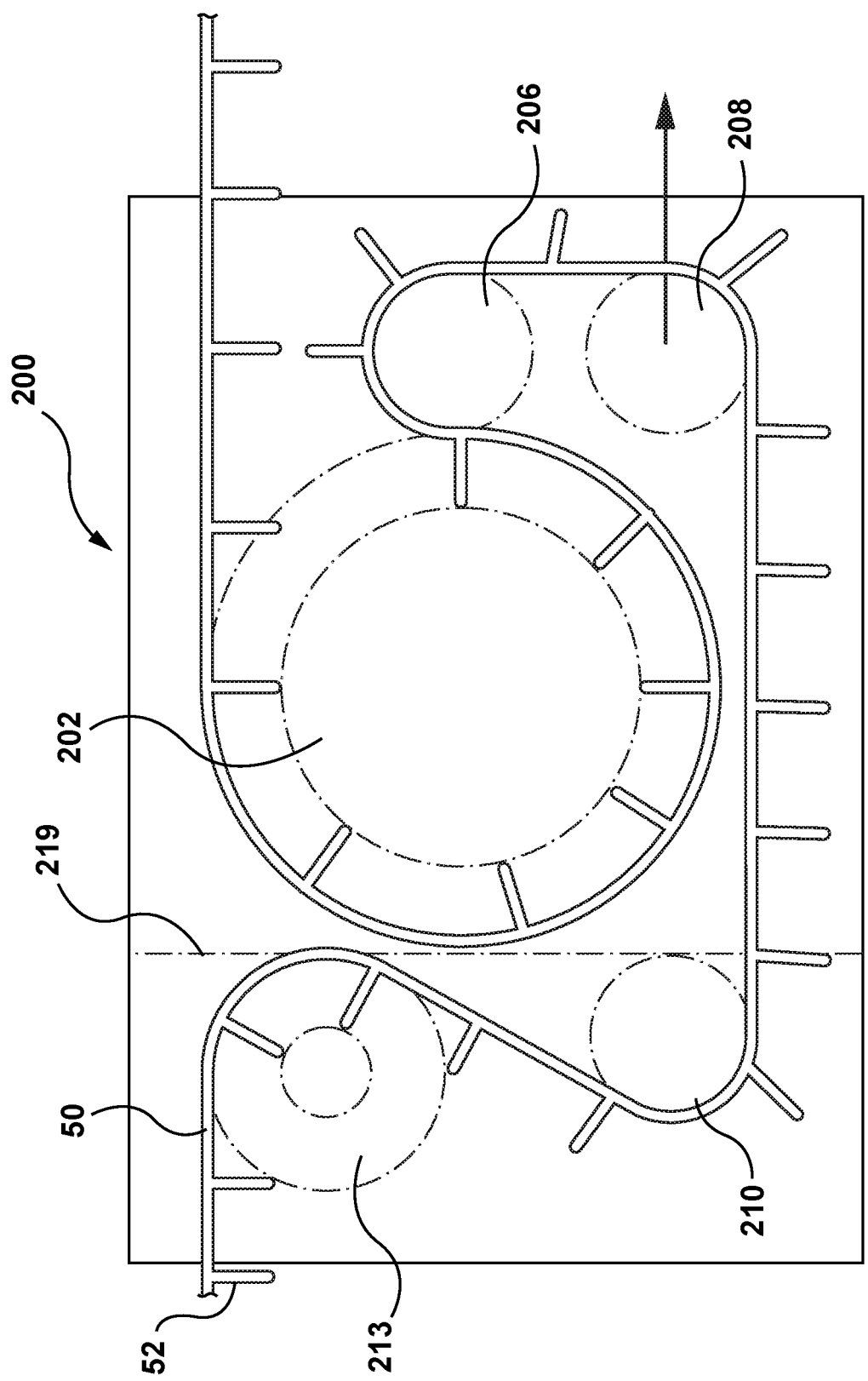
FIG. 26 is a side view of a drive system for a belt conveyor in accordance with another embodiment of the present invention.

FIG. 26 is a side view of a drive system 200 for a belt conveyor in accordance with another embodiment of the present invention. In the embodiment depicted in FIG. 26, the drive system 200 has a different configuration of rollers as compared with the embodiment of FIGS. 17-22. In the embodiment of FIG. 26, the drive roller 202, pinch roller 206 and take-up roller 208 are disposed as in the embodiment of FIGS. 17-22. However, unlike the embodiment of FIG. 17-22, the drive system 200 of FIG. 26 has the idler drum roller 210 and the idler bobbin roller 212 more vertically aligned. In the embodiment of FIGS. 17-22, the most forward point of the drum roller 210 is substantially vertically aligned with the most rearward point of the idler bobbin roller 212 such that the belt is substantially vertical between those two rollers. In contrast, in the embodiment of FIG. 26, the most rearward point of the drum roller 210 is substantially vertically aligned (along imaginary vertical line 219) with the most rearward point of the idler bobbin roller 212 such that the belt is angled rearwardly between those two rollers.

Figure 27:
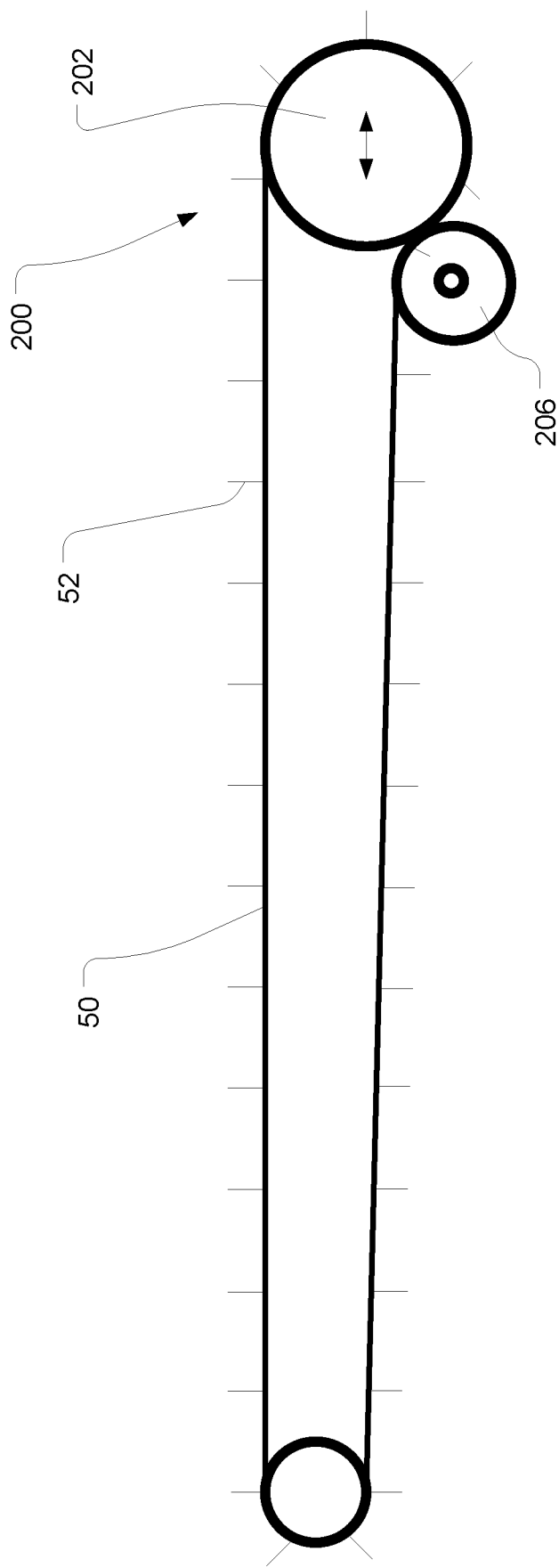
FIG. 27 is a side view of a drive system for a belt conveyor in accordance with yet another embodiment of the present invention.

FIG. 27 depicts another embodiment of the invention in which the drive system 200 has a drive roller 202 and a pinch roller 206. The pinch roller 206 in this embodiment is a bobbin roller that includes an internal space to accommodate the paddles 52 of the belt 50 as the belt passes over the bobbin roller. Tension on the belt can be adjusted by a tension-adjustment mechanism indicated by the two-headed arrow on the drive roller 202 in the figure.

Figure 28:
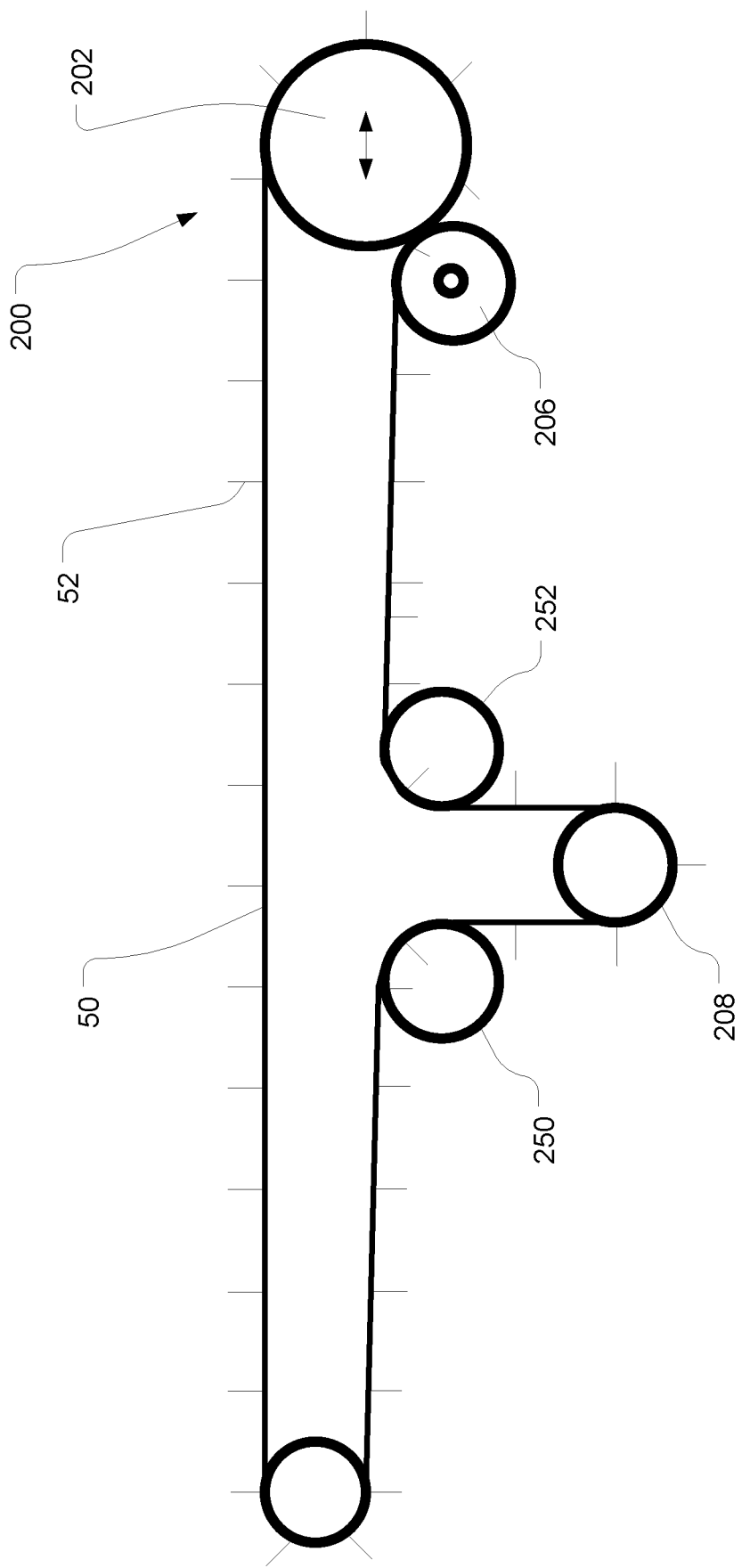
FIG. 28 is a side view of a drive system for a belt conveyor in accordance with yet another embodiment of the present invention.

FIG. 28 depicts yet another embodiment of the invention in which the drive system 200 has a take-up roller mechanism that includes a take-up roller 208 in addition to the drive roller 202 and the pinch roller 206. The take-up roller

208 in this embodiment is a drum roller. The take-up roller 208 cooperates with two bobbin rollers 250, 252 that act as idlers in this embodiment.

Method of Conveying Using Modified Drive System

In accordance with a further inventive aspect of the disclosure, the drive system enables the performance of a novel method of conveying particulate matter on a paddle belt conveyor. The method comprises driving a drive shaft to rotate a drive roller about a first axis to thereby move a conveyor belt of the paddle belt conveyor and pinching the belt between the pinch roller and the drive roller to augment the traction of the drive roller on the belt using a pinch roller mounted rotationally about a second axis parallel to the first axis. The method further includes directing the belt using a take-up roller rotatable about a third axis parallel to the first axis, a first idler roller rotatable about a fourth axis parallel to the first axis and a second idler roller rotatable about a fifth axis parallel to the first axis. The method may be used to convey grain, seed or any other particulate matter. The method may be performed, for example, to convey material from a hopper to a spout. The method, though initially conceived for use in the agricultural industry, may also be used to convey particulate matter in other industries. In one implementation of the method, the drive roller is a bobbin roller. In one implementation, the method further comprises guiding the belt toward the drive roller using a guided bobbin roller. In one implementation of ht method, the first idler roller is a drum roller and the second idler roller is a bobbin roller. In one implementation, the method further comprises exerting a force on the take-up roller using a spring connected to the take-up roller. Belt-guiding collars on the guided bobbin roller may be provided to improve belt tracking. The method may be performed on a conveyor having a hopper and a spout, wherein the drive system is disposed between the hopper and the spout.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A drive system for a paddle belt conveyor, the drive system comprising:
   a drive shaft;
   a drive roller rotationally driven by the drive shaft about a first axis, the drive roller exerting traction on a belt of the belt conveyor, wherein the belt comprises a plurality of paddles; and
   a pinch roller mounted rotationally about a second axis parallel to the first axis, the pinch roller pinching the belt between the pinch roller and the drive roller to augment the traction of the drive roller on the belt, wherein one of the driver roller and the pinch roller is a bobbin roller to accommodate the paddles of the belt;
   wherein the paddles have a height substantially equal to a difference between an outer radius of the bobbin roller and an inner radius of the bobbin roller.

2. The drive system of claim 1 further comprising:
   a take-up roller rotatable about a third axis parallel to the first axis;
   a first idler roller rotatable about a fourth axis parallel to the first axis; and
   a second idler roller rotatable about a fifth axis parallel to the first axis.

3. The drive system of claim 2 further comprising a guided bobbin roller for guiding the belt toward the drive roller.

4. The drive system of claim 3 further comprising belt-guiding collars on the guided bobbin roller to improve belt tracking.

5. The drive system of claim 2 wherein the first idler roller is a drum roller and wherein the second idler roller is a bobbin roller.

6. The drive system of claim 2 further comprising a spring connected to the take-up roller for exerting a force on the take-up roller.

7. The drive system of claim 1 wherein the drive roller is the drum roller.

8. A paddle belt conveyor comprising:
   a conveyor belt having a plurality of paddles;
   a drive system for driving the belt, the drive system having:
   a drive shaft;
   a drive roller rotationally driven by the drive shaft about a first axis, the drive roller exerting traction on the conveyor belt;
   a pinch roller mounted rotationally about a second axis parallel to the first axis, the pinch roller pinching the belt between the pinch roller and the drive roller to augment the traction of the drive roller on the belt wherein one of the driver roller and the pinch roller is a bobbin roller to accommodate the paddles of the belt;
   a take-up roller rotatable about a third axis parallel to the first axis;
   a first idler roller rotatable about a fourth axis parallel to the first axis; and
   a second idler roller rotatable about a fifth axis parallel to the first axis;
   a hopper and a spout, wherein the drive system is disposed between the hopper and the spout.

9. The conveyor of claim 8 wherein the drive roller is a drum roller.

10. The conveyor of claim 8 further comprising a guided bobbin roller for guiding the belt toward the drive roller.

11. The conveyor of claim 10 further comprising belt-guiding collars on the guided bobbin roller to improve belt tracking.

12. The conveyor of claim 8 wherein the first idler roller is a drum roller and wherein the second idler roller is a bobbin roller.

13. The conveyor of claim 8 further comprising a spring connected to the take-up roller for exerting a force on the take-up roller.

* * * * *